United States Patent
Kim

(10) Patent No.: US 12,391,297 B2
(45) Date of Patent: Aug. 19, 2025

(54) DRIVING OPERATION APPARATUS FOR VEHICLE

(71) Applicants: HYUNDAI MOTOR COMPANY, Seoul (KR); KIA CORPORATION, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 181 days.

(21) Appl. No.: 18/504,792

(22) Filed: Nov. 8, 2023

(65) Prior Publication Data
US 2025/0033686 A1    Jan. 30, 2025

(30) Foreign Application Priority Data
Jul. 26, 2023   (KR) .................. 10-2023-0097469

(51) Int. Cl.
*B62D 1/14*   (2006.01)
*B60K 26/02*  (2006.01)
(Continued)

(52) U.S. Cl.
CPC ............... *B62D 1/14* (2013.01); *B60K 26/02* (2013.01); *B60K 35/00* (2013.01); *B60T 7/085* (2013.01); *B60W 50/14* (2013.01); *B60W 60/001* (2020.02); *B60K 2026/024* (2013.01); *B60K 2026/028* (2013.01); *B60K 35/22* (2024.01); *B60K 35/53* (2024.01); *B60K 2360/1523* (2024.01); *B60W 2050/146* (2013.01)

(58) Field of Classification Search
CPC ... B62D 1/14; B62D 1/12; B62D 1/02; B62D 1/04; B60K 35/00; B60K 35/22; B60K 35/53; B60K 2026/024; B60K 2026/028; B60K 35/223; B60K 35/29; B60K 2360/175; B60R 11/0229; B60R 2011/0085
See application file for complete search history.

(56) References Cited

U.S. PATENT DOCUMENTS 9,193,375 B2 *  11/2015 Schramm ............ B60R 11/0235
10,496,102 B2 * 12/2019 Riefe .................... B60K 35/10
(Continued)

FOREIGN PATENT DOCUMENTS

JP    2025003210 A *  1/2025 ............ B60K 35/60
KR    2020-0037630 A    4/2020

OTHER PUBLICATIONS

Computer generated English translation of JP 2025/003210 (Year: 2025).*

*Primary Examiner* — Paul N Dickson
*Assistant Examiner* — Tiffany L Webb
(74) *Attorney, Agent, or Firm* — MCDONNELL BOEHNEN HULBERT & BERGHOFF LLP

(57) ABSTRACT

A driving operation apparatus for a vehicle, and a steering unit provided on a center display, an acceleration unit provided on a right display, and a braking unit provided on a left display become a driving operation system of a vehicle and is integrally modularized as one system, and the driving operation apparatus may have a display to assist to improve a passenger's entertainment in an autonomous driving situation and provide vehicle information and nearby information in a manual driving mode.

20 Claims, 23 Drawing Sheets

(51) Int. Cl.
*B60K 35/00* (2024.01)
*B60K 35/22* (2024.01)
*B60K 35/53* (2024.01)
*B60T 7/08* (2006.01)
*B60W 50/14* (2020.01)
*B60W 60/00* (2020.01)

(56) References Cited

U.S. PATENT DOCUMENTS

| | | |
|---|---|---|
| 10,988,161 B2 * | 4/2021 | Krstic .................... B62D 1/189 |
| 11,358,625 B2 * | 6/2022 | Harmon ................. B60K 35/80 |
| 2016/0375770 A1 * | 12/2016 | Ryne .................... B60K 35/215 |
| | | 701/23 |
| 2016/0375860 A1 * | 12/2016 | Lubischer .............. B62D 1/183 |
| | | 74/493 |
| 2021/0107358 A1 * | 4/2021 | Shibata ................ B60K 35/654 |
| 2024/0253687 A1 * | 8/2024 | Wang ..................... G06F 9/451 |

* cited by examiner

DRIVING OPERATION APPARATUS FOR VEHICLE

CROSS REFERENCE TO RELATED APPLICATIONS

The present application claims priority to Korean Patent Application No. 10-2023-0097469, filed Jul. 26, 2023, the entire contents of which is incorporated herein for all purposes by this reference.

BACKGROUND

Field of the Disclosure

The present disclosure relates to a driving operation apparatus for a vehicle, and more specifically, to a driving operation apparatus for a vehicle, which has a driving operation system for steering, acceleration, and braking integrally modularized as one system, is hidden not to be operated by a driver in an autonomous driving situation, and popped up to be operated by the driver in a manual driving mode.

Description of the Related Art

Autonomous driving vehicles are smart vehicles incorporating an autonomous driving technology in which the vehicle travels to a destination by itself even without a driver directly operating a steering wheel, an accelerator pedal, a brake, or the like.

When autonomous driving situations are universally realized, the driver may select a manual driving mode in which the driver directly drives the vehicle, and an autonomous driving mode in which the vehicle travels to the destination by itself without the driver directly driving the vehicle.

A driving operation system of an autonomous driving vehicle typically includes a steering operation system, an acceleration operation system, and a braking operation system, and conventionally, operation systems for steering, acceleration, and braking are each configured individually, and thus there is a disadvantage in that there are many spatial limits because the number of components is large and each requires an installation space and in particular, the cost is expensive.

In addition, a larger number of displays are required to improve a passenger's convenience in the autonomous driving situation, and conventionally, there is a disadvantage in that there is a limit to satisfying the passenger's needs because the display is provided to only a restricted position.

The matters explained as the background art are for the purpose of enhancing the understanding of the background of the present disclosure and should not be taken as acknowledging that they correspond to the related art already known to those skilled in the art.

SUMMARY

The present disclosure is directed to providing a driving operation apparatus for a vehicle, which may have a driving operation system for steering, acceleration, and braking integrally modularized as one system, thereby achieving a reduction in a weight and a reduction in a cost by decreasing the number of components and maximizing the utilization of an indoor space by minimizing a layout required for an installation space.

In addition, the present disclosure is directed to providing a driving operation apparatus, which may have a configuration that is hidden not to be operated by a driver in an autonomous driving situation and popped up to be operated by the driver in a manual driving mode, thereby allowing the driver to rest comfortably and achieving safety improvement by blocking a mal-operation in the autonomous driving situation.

In addition, the present disclosure is directed to providing a driving operation apparatus, which may have a display to assist to improve a passenger's entertainment in an autonomous driving situation and provide vehicle information and nearby information in a manual driving mode, thereby improving convenience and safety.

A driving operation apparatus for a vehicle for achieving the objects includes a driving operation apparatus for a vehicle including a center display rotatably installed on a center fascia inside the vehicle, a right display and a left display rotatably coupled to right and left sides of the center display, respectively, a steering unit provided on the center display and the center fascia and configured to generate a signal related to a steering of the vehicle when the center display is rotated in a clockwise direction or counterclockwise direction by a driver's operation, an acceleration unit provided on any one of the right display and the left display and configured to generate a signal related to an acceleration of the vehicle during the driver's operation, and a braking unit provided on the other one of the right display and the left display and configured to generate a signal related to a braking of the vehicle during the driver's operation.

In an autonomous driving mode, a screen in which the center display, the right display, and the left display may be unfolded in a row in a left-right direction and connected as one may be provided.

In a situation of the autonomous driving mode, positions of the right display and the left display unfolded in a row may be restricted by contact with the center fascia.

In a manual driving mode, the right display and the left display may be popped up by being rotated toward the driver rearward from the center display, and in the popped-up state, screens in which the center display, the right display, and the left display are individually separated may be provided.

The right display and the left display popped up in the manual driving mode may form a right angle or an obtuse angle with respect to the center display, and in the case of the obtuse angle, popped-up angles of the right display and the left display may be the same.

Positions of the right display and the left display popped up at the right angle may be restricted during contact with the right and left sides of the center display or positions of the right display and the left display popped up at the obtuse angle may be restricted by locking of an actuator configured to pop up the right display and the left display.

The driving operation apparatus may further include a first power unit connecting the center display to the right display and configured to rotate the right display with respect to the center display when operated, wherein the first power unit may include a first motor fixed to a right side portion of the center display, and a first motor rod which is rotated by power of the first motor, which is integrally coupled after passing through a left side portion of the right display, and of which an end portion is rotatably installed on the right side portion of the center display.

The driving operation apparatus may further include a second power unit connecting the center display to the left display and configured to rotate the left display with respect to the center display when operated, wherein the second power unit may include a second motor fixed to a left side portion of the center display, and a second motor rod which is rotated by power of the second motor, which is integrally coupled after passing through a right side portion of the left display, and of which an end portion is rotatably installed on the left side portion of the center display.

The center display may include a steering shaft protruding forward to pass through the center fascia and configured to rotate with respect to the center fascia, a steering shaft clip coupled to the steering shaft and configured to prevent the steering shaft from being separated from the center fascia, and a steering return spring having both ends coupled to the center fascia and the steering shaft and configured to provide a return force when the steering shaft is rotated.

The steering unit may include a first permanent magnet coupled to a front surface of the center display or the steering shaft, and a first printed circuit board (PCB) installed to face the first permanent magnet and configured to recognize a change in magnetic flux when the first permanent magnet is rotated and generate a signal related to a steering.

The acceleration unit may include a first slider installed to be moved in a longitudinal direction of the right display and having an end portion provided with a first handle, a third power unit connecting the right display to the first slider and configured to move the first slider with respect to the right display when operated, an acceleration button rotatably provided on the first handle and operated by a driver's pressing, a second permanent magnet coupled to the acceleration button, and a second PCB installed on the first slider to face the second permanent magnet and configured to recognize a change in magnetic flux when the second permanent magnet is moved by an operation of the acceleration button and generate a signal related to an acceleration.

The third power unit may include a third motor fixed to the right display, a first ball screw configured to be rotated by power of the third motor, a first ball screw nut coupled to the first ball screw and configured to move along the first ball screw when the first ball screw is rotated, and a first guider coupled to the first ball screw nut and the first slider and configured to move the first slider while moving with the first ball screw nut.

The third power unit may further include a first guide rod disposed parallel to the first ball screw and installed to have one end fixed to the right display and the other end passing through the first guider.

An acceleration button protrusion may be provided to protrude outward from the acceleration button, and a full stroke position of the acceleration button may be restricted when the acceleration button protrusion is in contact with an inner wall surface of the first handle, and when the acceleration button protrusion is in contact with an inner upper surface of the first handle, a return position or initial position of the acceleration button may be restricted.

The braking unit may include a second slider installed to be moved in a longitudinal direction of the left display and having an end portion provided with a second handle, a fourth power unit connecting the left display to the second slider and configured to move the second slider with respect to the left display when operated, a braking button rotatably provided on the second handle and operated by a driver's pressing, a third permanent magnet coupled to the braking button, and a third PCB installed on the second slider to face the third permanent magnet and configured to recognize a change in magnetic flux when the third permanent magnet is moved by an operation of the braking button and generate a signal related to a braking.

The fourth power unit may include a fourth motor fixed to the left display, a second ball screw configured to be rotated by power of the fourth motor, a second ball screw nut coupled to the second ball screw and configured to move along the second ball screw when the second ball screw is rotated, and a second guider coupled to the second ball screw nut and the second slider and configured to move the second slider while moving with the second ball screw nut.

The fourth power unit may further include a second guide rod disposed parallel to the second ball screw and installed to have one end fixed to the left display and the other end passing through the second guider.

A braking button protrusion may be provided to protrude outward from the braking button, and a full stroke position of the braking button may be restricted when the braking button protrusion is in contact with an inner wall surface of the second handle, and when the braking button protrusion is in contact with an inner upper surface of the second handle, a return position or initial position of the braking button may be restricted.

In addition, a driving operation apparatus for a vehicle includes a center display installed on a center fascia inside the vehicle to be rotated in a clockwise direction or counterclockwise direction, and a right display and a left display coupled to right and left sides of the center display, respectively to be rotated in a front-rear direction, wherein in an autonomous driving mode, a screen in which the center display, the right display, and the left display are unfolded in a row in a left-right direction and connected as one is provided, and in a manual driving mode, the right display and the left display are popped up by being rotated toward the driver rearward from the center display, and the center display, the right display, and the left display, which have been popped up, become a driving operation system of the vehicle.

The driving operation system may include steering, acceleration, and braking of the vehicle, an acceleration button may be provided on the right display, and a braking button may be provided on the left display, the steering of the vehicle may be executed when the center display is rotated in a clockwise direction or a counterclockwise direction by a driver's operation, and the acceleration or braking of the vehicle may be executed when the driver operates the acceleration button or the braking button.

The driving operation apparatus for a vehicle according to the present disclosure may have the configuration that has the driving operation system for steering, acceleration, and braking of the vehicle through the steering unit 400 provided on the center display 100, the acceleration unit 500 provided on the right display 200, and the braking unit 600 provided on the left display 300 integrally modularized as one system, thereby achieving the reduction in the weight and the reduction in the cost by decreasing the number of components and in particular, maximizing the utilization of the indoor space by minimizing the layout required for the installation space.

In addition, the driving operation apparatus according to the present disclosure may have the configuration that becomes a hide state in which the driver's operation is not available as the center display 100, the right display 200, and the left display 300 are unfolded in a row from side to side and are in close contact with the center fascia 10 in the autonomous driving situation and is popped up so that the right display 200 and the left display 300 protrude toward the driver to be operated by the driver in the manual driving mode, thereby allowing the driver to rest comfortably in the autonomous driving situation and achieving safety improvement by block the mal-operation.

In addition, the driving operation apparatus according to the present disclosure may have the display to assist to improve the passenger's entertainment in the autonomous driving situation and provide the vehicle information and the nearby information in the manual driving mode, thereby improving convenience and safety.

DETAILED DESCRIPTION

Figure 1:
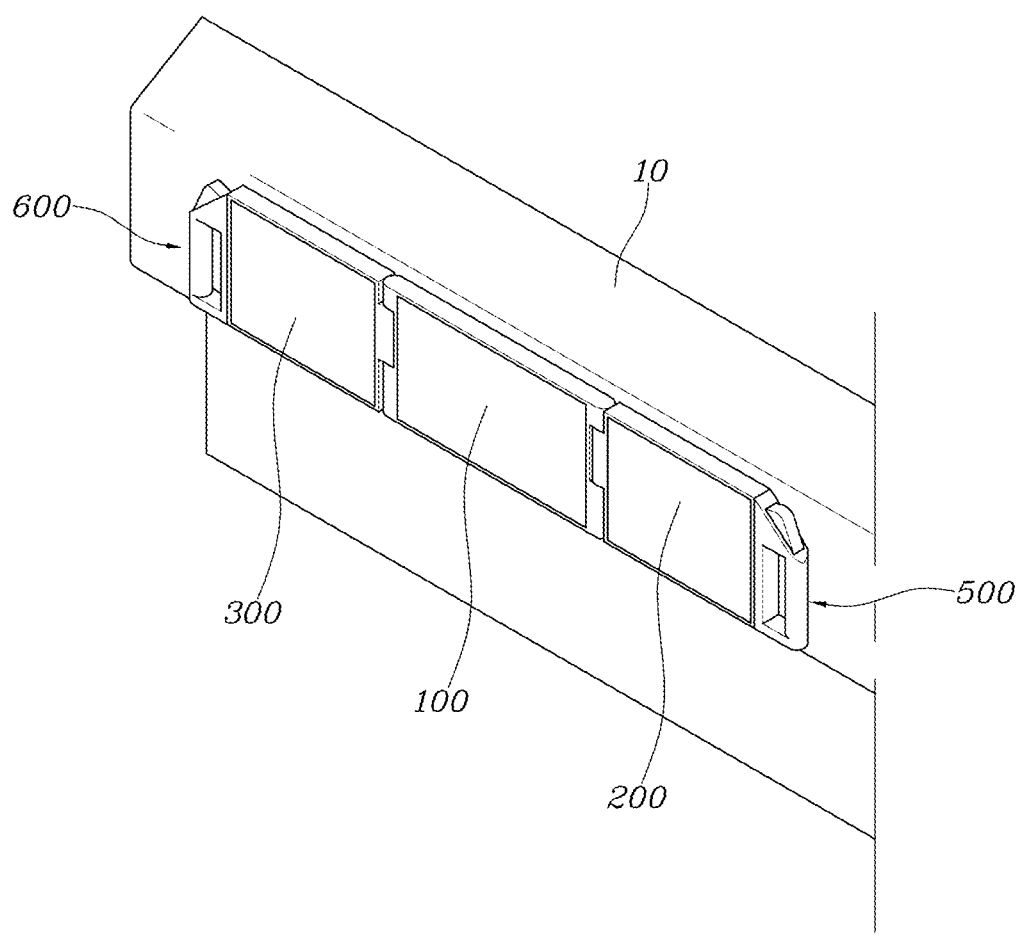
FIG. 1 is a view illustrating a hide state in which a center display, a right display, and a left display are unfolded in a row from side to side as a driving operation apparatus for a vehicle according to the present disclosure.
Figure 2:
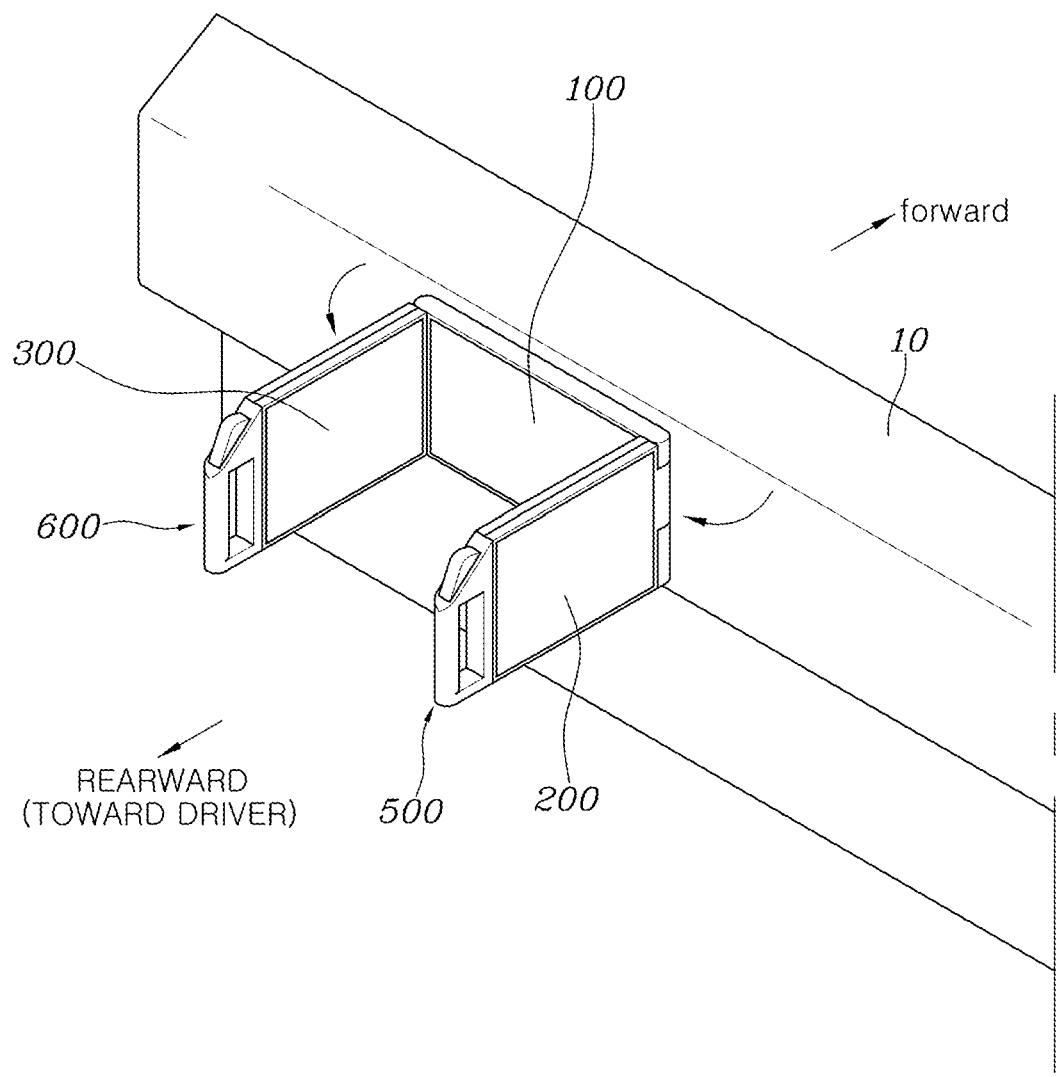
FIG. 2 is a view illustrating a state in which the right display and the left display are popped up at a right angle in FIG. 1.

Hereinafter, embodiments disclosed in this specification will be described in detail with reference to the accompanying drawings, and the same or similar components are denoted by the same reference numerals regardless of the drawing symbols, and overlapping descriptions thereof will be omitted.

The suffixes "module" and "unit" for components used in the following description are given or used interchangeably in consideration of ease of preparing the specification and not have meanings or roles that are distinct from each other by themselves.

In describing the embodiments disclosed in the specification, when it is determined that a detailed description of a related known technology may obscure the gist of the embodiments disclosed in this specification, a detailed description thereof will be omitted.

In addition, the accompanying drawings are only for easy understanding of the embodiments disclosed in the specification, and it should be understood that the technical spirit disclosed in the specification is not limited by the accompanying drawings, and all changes, equivalents, or substitutes included in the spirit and technical scope of the present disclosure are included in the accompanying drawings.

Terms including ordinal numbers such as first or second may be used to describe various components, but the components are not limited by the terms. The terms are used only for the purpose of distinguishing one component from another.

When a first component is described as being "connected" or "coupled" to a second component, it should be understood that the first component may be directly connected or coupled to the second component or a third component may be present therebetween.

On the other hand, when the first component is described as being "directly connected" or "directly coupled" to the second component, it should be understood that the third component is not present therebetween.

The singular expression includes the plural expression unless the context clearly dictates otherwise.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

In addition, a unit or control unit included in the name of a motor control unit (MCU), a hybrid control unit (HCU), or the like is the term widely used for naming a controller for controlling a specific function of a vehicle and does not mean a generic function unit.

A controller may include a communication device for communicating with another controller or a sensor to control a function in charge, a memory for storing an operating system or logic commands and input and output information, and one or more processors for performing determination, calculation, decision, and the like necessary for controlling the function in charge.

Hereinafter, a driving operation apparatus for a vehicle according to preferred embodiments of the present disclosure will be described with reference to the accompanying drawings.

As illustrated in FIGS. 1 to 23, the driving operation apparatus according to the present disclosure includes a center display 100 rotatably installed on a center fascia 10 inside a vehicle, a right display 200 and a left display 300 rotatably coupled to right and left sides of the center display 100, respectively, a steering unit 400 provided on the center display 100 and the center fascia 10 and for generating a signal related to a steering of the vehicle when the center display 100 is rotated in a clockwise direction or a counterclockwise direction by a driver's operation, an acceleration unit 500 provided on any one of the right display 200 and the left display 300 and for generating a signal related to an acceleration of the vehicle during the driver's operation, and a braking unit 600 provided on the other one of the right display 200 and the left display 300 and for generating a signal related to a braking of the vehicle during the driver's operation.

The driving operation apparatus according to the embodiment of the present disclosure may have a configuration that has a driving operation system for steering, acceleration, and braking of the vehicle through the steering unit 400 provided on the center display 100, the acceleration unit 500 provided on the right display 200, and the braking unit 600 provided on the left display 300 integrally modularized as one system, thereby achieving a reduction in a weight and a reduction in a cost by decreasing the number of components and in particular, maximizing the utilization of an indoor space by minimizing a layout required for an installation space.

The center display 100 may be positioned at the center, may function as a main display, and may be formed to have a relatively larger screen than the right display 200 and the left display 300 as a length in a left-right direction is formed longer than those of the right display 200 and the left display 300.

The right display 200 and the left display 300 may function as auxiliary displays connected to sides of the center display 100 and may be formed to have a relatively smaller screen as the lengths in the left-right direction are formed shorter than that of the center display 100.

The center display 100 may be rotated in the clockwise direction or the counterclockwise direction with respect to the center fascia 10 during the driver's operation, and the right display 200 and the left display 300 are respectively coupled to the right and left sides of the center display 100 to be rotated in a front-rear direction.

Although the embodiment of the present disclosure has suggested an example in which the acceleration unit 500 is provided on the right display 200, and the braking unit 600 is provided on the left display 300, the braking unit 600 may be provided on the right display 200, and the acceleration unit 500 may be provided on the left display 300, as necessary.

In an autonomous driving mode, as illustrated in FIG. 1, a screen in which the center display 100, the right display 200, and the left display 300 are unfolded in a row in the left-right direction and connected as one is provided.

In the autonomous driving mode, a wide screen may be provided by the center display 100, the right display 200, and the left display 300, which are straightly unfolded, and the driver may more conveniently enjoy entertainment information, such as movies and games, provided through the wide screen.

In a situation of the autonomous driving mode illustrated in FIG. 1, positions of the right display 200 and the left display 300 unfolded in a row may be restricted by contact with the center fascia 10.

As the autonomous driving mode is executed, when the center display 100, the right display 200, and the left display 300 become a state of being unfolded in a row, the driving operation apparatus becomes a hide state in which the driver's operation is not available, thereby allowing the driver to rest comfortably and assist to improve safety by blocking a mal-operation.

Figure 3:
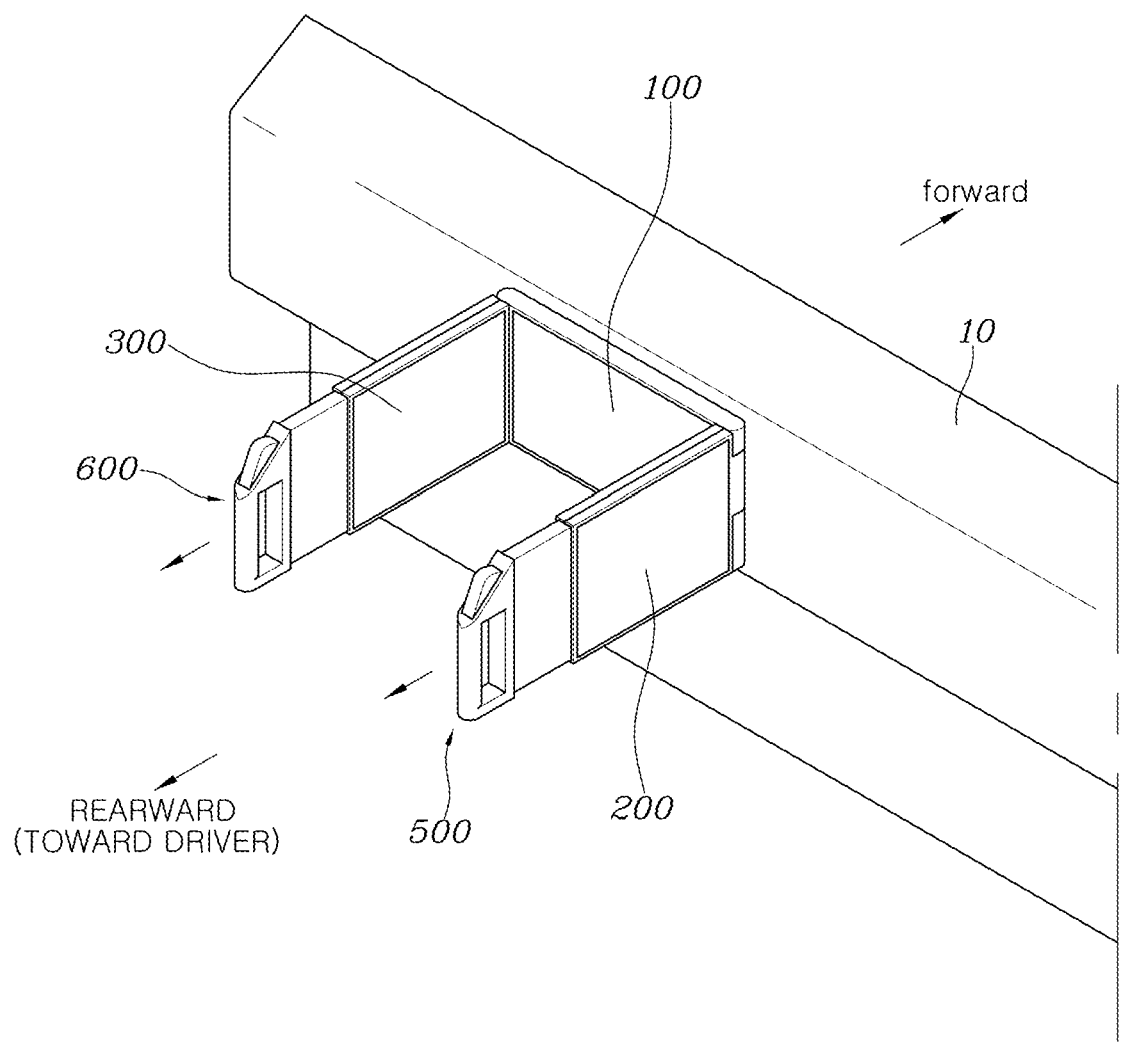
FIG. 3 is a view illustrating a state in which an acceleration unit and a braking unit are slid to protrude toward a driver in FIG. 2.
Figure 4:
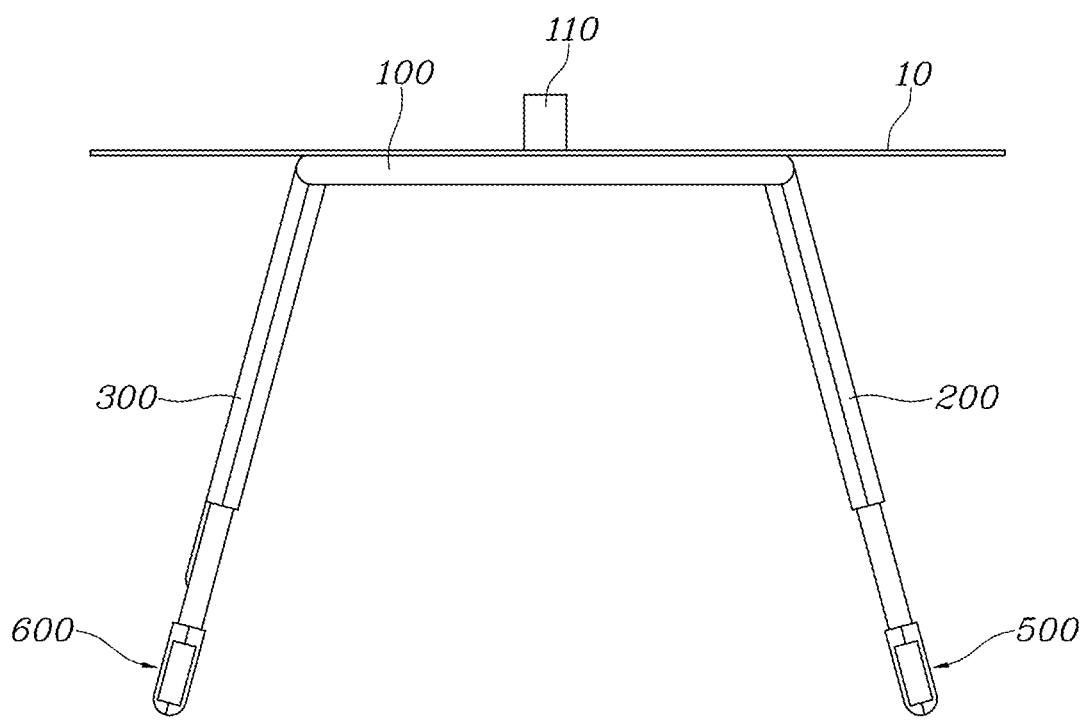
FIG. 4 is a view illustrating another embodiment in which the right display and the left display are popped up at an obtuse angle.
Figure 5:
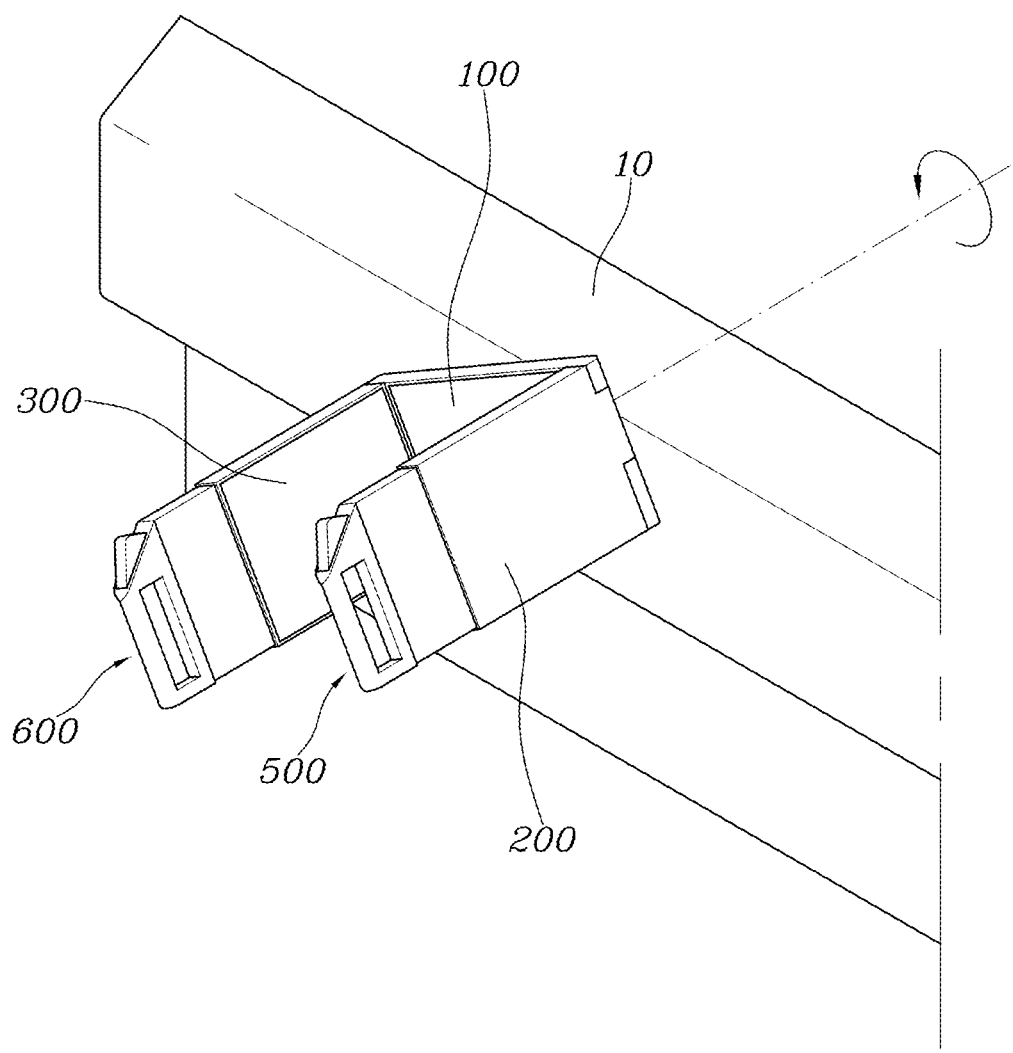
FIG. 5 is a view illustrating a state in which the center display is rotated in a counterclockwise direction and steered in FIG. 3.

In a manual driving mode, as illustrated in FIGS. 3 and 4, the right display 200 and the left display 300 are popped up by being rotated toward the driver rearward from the center display 100, and in the popped-up state, screens in which the center display 100, the right display 200, and the left display 300 are individually separated are provided.

As the manual driving mode is executed, when the right display 200 and the left display 300 are popped up, the driver's operation is available from this moment.

In a situation of the manual driving mode, vehicle information (cluster information) and the like may be provided through the center display 100, information about a right side mirror, information about a change to a right lane line, and the like may be provided through the right display 200, and information about a left side mirror, information about a change to a left lane line, and the like may be provided through the left display 300.

The right display 200 and the left display 300 popped up in the manual driving mode form a right angle with respect to the center display 100 as illustrated in FIG. 3 or form an obtuse angle with respect to the center display 100 as illustrated in FIG. 4, and in the case of the obtuse angle, popped-up angles of the right display 200 and the left display 300 are the same.

As illustrated in FIG. 3, when the right display 200 and the left display 300 are popped up at the right angle, the driver may not keep an eye on the right display 200 and the left display 300, and thus necessary information may be provided through only the center display 100, and in this case, the right display 200 and the left display 300 may maintain a power saving mode.

As illustrated in FIG. 4, when the right display 200 and the left display 300 are popped up at the obtuse angle, information may be provided through all of the center display 100, the right display 200, and the left display 300, or necessary information may be provided through only the center display 100.

When the right display 200 and the left display 300 are popped up at the obtuse angle, the popped-up angles are the same, and thus the driver may grip the acceleration unit 500 and the braking unit 600 with both arms in a balanced manner and operate the acceleration unit 500 and the braking unit 600 with a more comfortable attitude.

When the right display 200 and the left display 300 are popped up at the right angle, it is advantageous for drivers who want to narrowly grip the right display 200 and the left display 300 while closing both arms, and in particular, this may become an advantageous condition for female drivers with narrow shoulders.

In addition, when the right display 200 and the left display 300 are popped up at the obtuse angle, it is advantageous for drivers who want to broadly grip the right display 200 and the left display 300 while opening both arms, and in particular, this may become an advantageous condition for male drivers with broad shoulders.

As illustrated in FIG. 3, when the right display 200 and the left display 300 are popped up at the right angle, the right display 200 and the left display 300 may be in contact with the right and left sides of the center display 100, respectively, and thus positions of the right display 200 and the left display 300 popped up at the right angle may be restricted.

In addition, as illustrated in FIG. 4, when the right display 200 and the left display 300 are popped up at the obtuse angle, positions of the right display 200 and the left display 300 popped up at the obtuse angle may be restricted by locking of an actuator for popping-up the right display 200 and the left display 300.

In particular, when the actuator for popping up the right display 200 and the left display 300 is configured as a step motor, the right display 200 and the left display 300 may be fixed at various obtuse angle positions.

The driving operation apparatus according to the embodiment of the present disclosure further includes a first power unit 700 (shown in FIGS. 9-10) connecting the center display 100 to the right display 200 and for rotating the right display 200 with respect to the center display 100 when operated.

The first power unit 700 includes a first motor 710 fixed to a right side portion of the center display 100, and a first motor rod 720 which is rotated by power of the first motor 710, which is integrally coupled after passing through a left side portion of the right display 200, and of which an end portion is rotatably installed on the right side portion of the center display 100.

The first motor 710 may function to not only rotate the right display 200 but also lock the right display 200 not to be rotated.

In particular, when the first motor 710 is configured as a step motor, a popped-up position of the right display 200 may be accurately fixed at various positions desired by the driver, and thus the right display 200 may be fixed at various obtuse angle positions suitable for the driver's body type.

The driving operation apparatus according to the embodiment of the present disclosure further includes a second power unit 800 connecting the center display 100 to the left display 300 and for rotating the left display 300 with respect to the center display 100 when operated.

The second power unit 800 includes a second motor 810 fixed to a left side portion of the center display 100, and a second motor rod 820 which is rotated by power of the second motor 810, which is integrally coupled after passing through a right side portion of the left display 300, and of which an end portion is rotatably installed on the left side portion of the center display.

The second motor 810 may function to not only rotate the left display 300 but also lock the left display 300 not to be rotated.

In particular, when the second motor 810 is configured as a step motor, a popped-up position of the left display 300 may be accurately fixed at various positions desired by the driver, and thus the left display 300 may be fixed at various obtuse angle positions suitable for the driver's body type.

The first motor 710 and the second motor 810 are operated by the control of a vehicle control unit when a driving mode of the vehicle is changed from the autonomous driving mode to the manual driving mode or changed from the manual driving mode to the autonomous driving mode, and when operated, it is preferable that the first motor 710 and the second motor 810 are operated together and have the same operating time, but the present disclosure is not limited thereto.

The center display 100 according to the present disclosure includes a steering shaft 110 protruding forward to pass through the center fascia 10 and configured to rotate with respect to the center fascia 10, a steering shaft clip 120 coupled to the steering shaft 110 and for preventing the steering shaft 110 from being separated from the center fascia 10, and a steering return spring 130 of which both ends are coupled to the center fascia 10 and the steering shaft 110 and which provides a return force when the steering shaft 110 is rotated.

One end of the steering shaft 110 is provided to be integrally connected to a front central portion of the center display 100, the other end of the steering shaft 110 passes through the center fascia 10 and protrudes forward, and the steering shaft clip 120 is coupled to an end portion of the steering shaft 110 passing through the center fascia 10 and functions to prevent the steering shaft 110 from being separated from a hole of the center fascia 10.

The steering return spring 130 is formed of a coil spring, the end portion of the steering shaft 110 passing through the center fascia 10 passes through the center of the steering return spring 130, and the steering return spring 130 has both ends coupled to the center fascia 10 and the steering shaft 110 and provides an elastic force of returning the steering shaft 110 to a neutral position when the steering shaft 110 is rotated.

The steering unit 400 according to the present disclosure includes a first permanent magnet 410 coupled to a front surface of the center display 100 or the steering shaft 110, and a first printed circuit board (PCB) 420 installed to face the first permanent magnet 410 and for recognizing a change in magnetic flux when the first permanent magnet 410 is rotated and generating a signal related to a steering.

It is preferable that two first permanent magnets 410 are formed for safety, but the present disclosure is not limited thereto.

Figure 6:
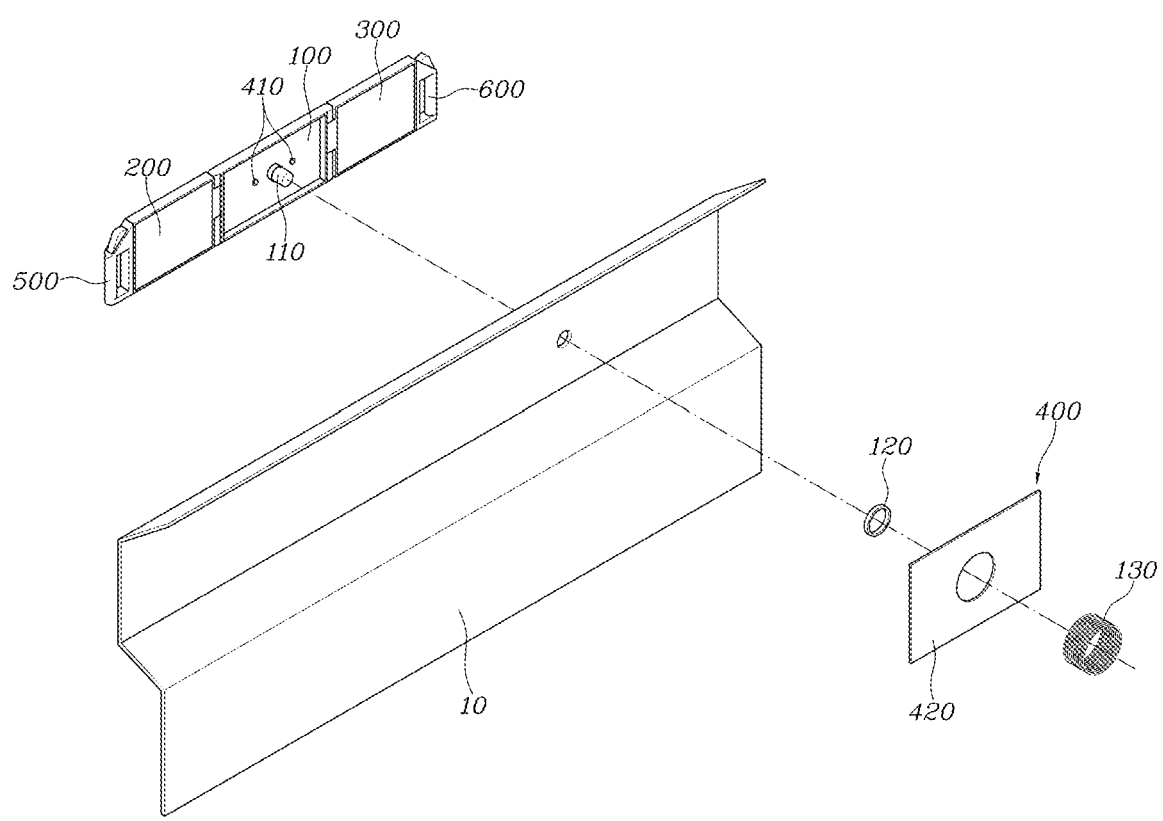
FIG. 6 is a view illustrating the driving operation apparatus according to the present disclosure separated from a center fascia.
Figure 9:
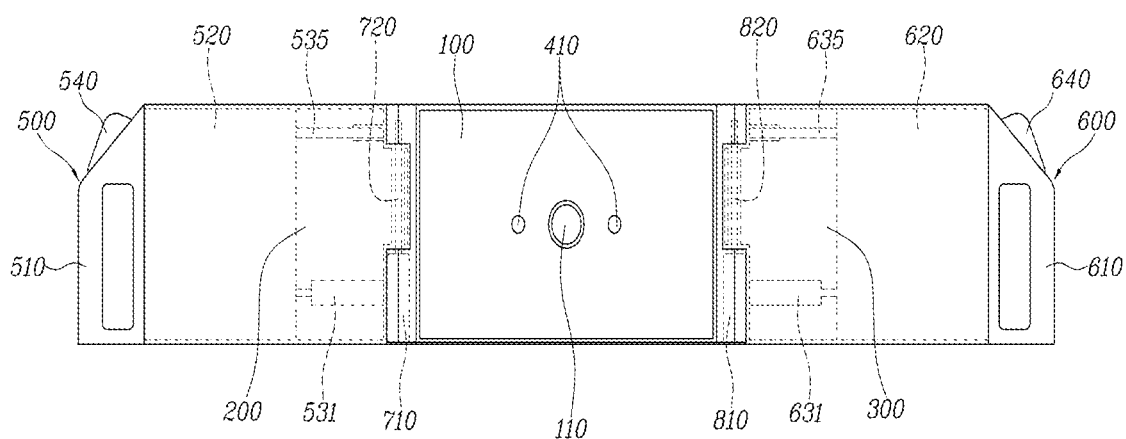
FIG. 9 is a view illustrating a state in which the center display, the right display, and the left display are unfolded in a row viewed from the front.
Figure 10:
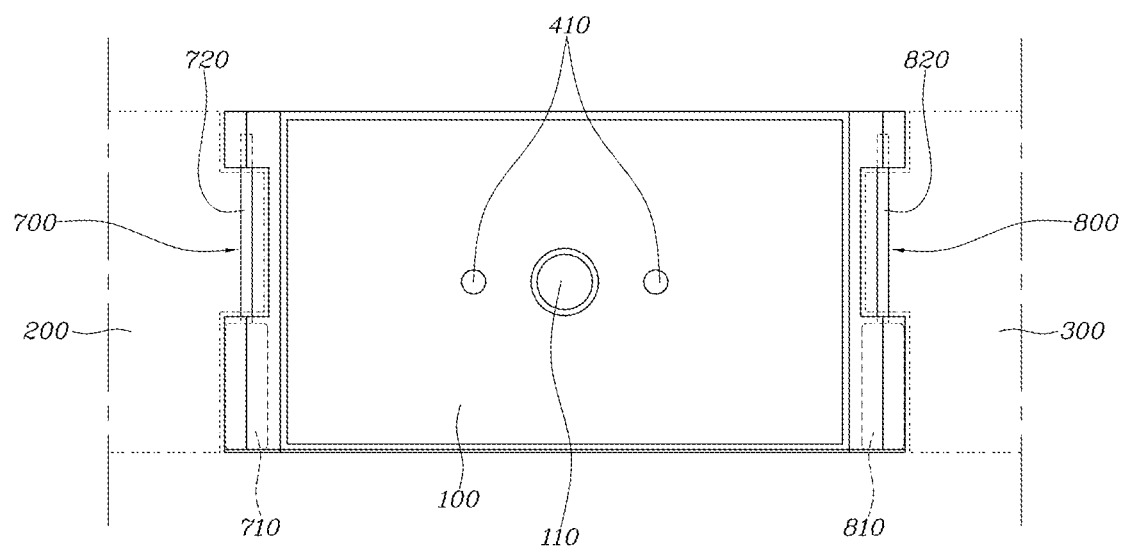
FIG. 10 is an enlarged view illustrating the state in FIG. 9 and a view for describing a first power unit and a second power unit according to the present disclosure.
Figure 11:
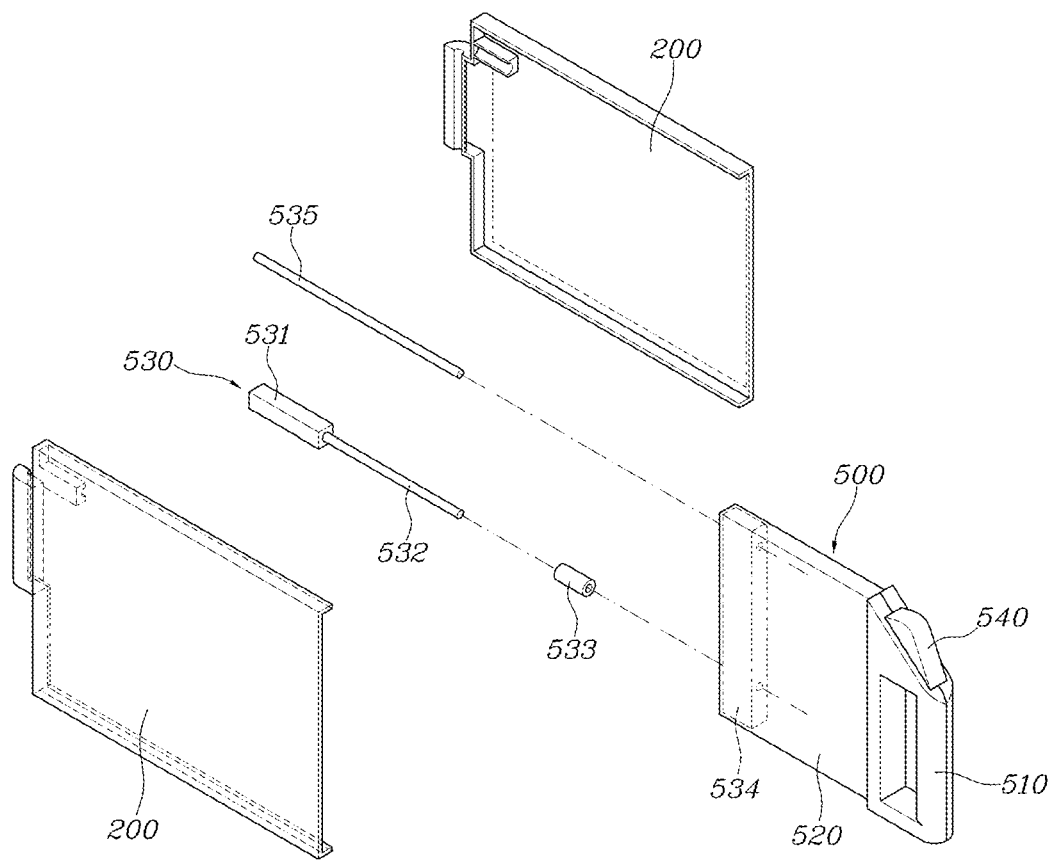
FIGS. 11, 12, 13, 14, 15, 16, and 17 are views for describing the acceleration unit according to the present disclosure.
Figure 12:
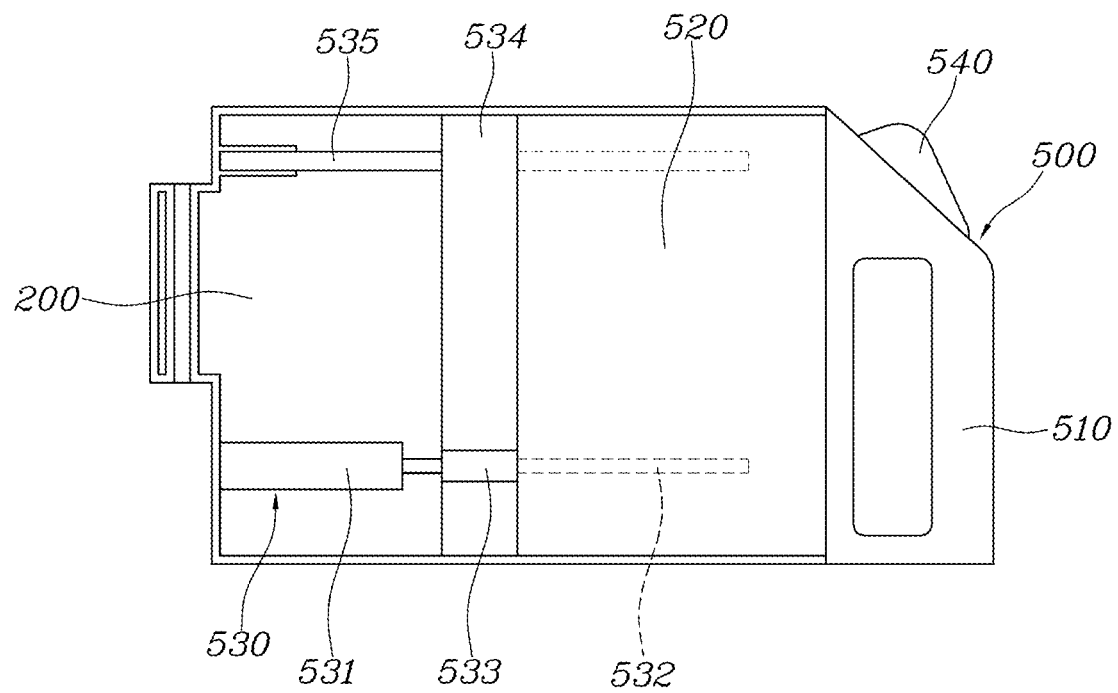

As illustrated in FIGS. 6, 9, and 10, the two first permanent magnets 410 may be fixed to the front surface of the center fascia 10 symmetrically based on the steering shaft 110, and in this case, the first PCB 420 is fixed to face the center display 100, recognizes the change in magnetic flux through the Hall sensor when the first permanent magnet 410 is rotated by the rotation of the center display 100, and generates the signal related to the steering.

Figure 7:
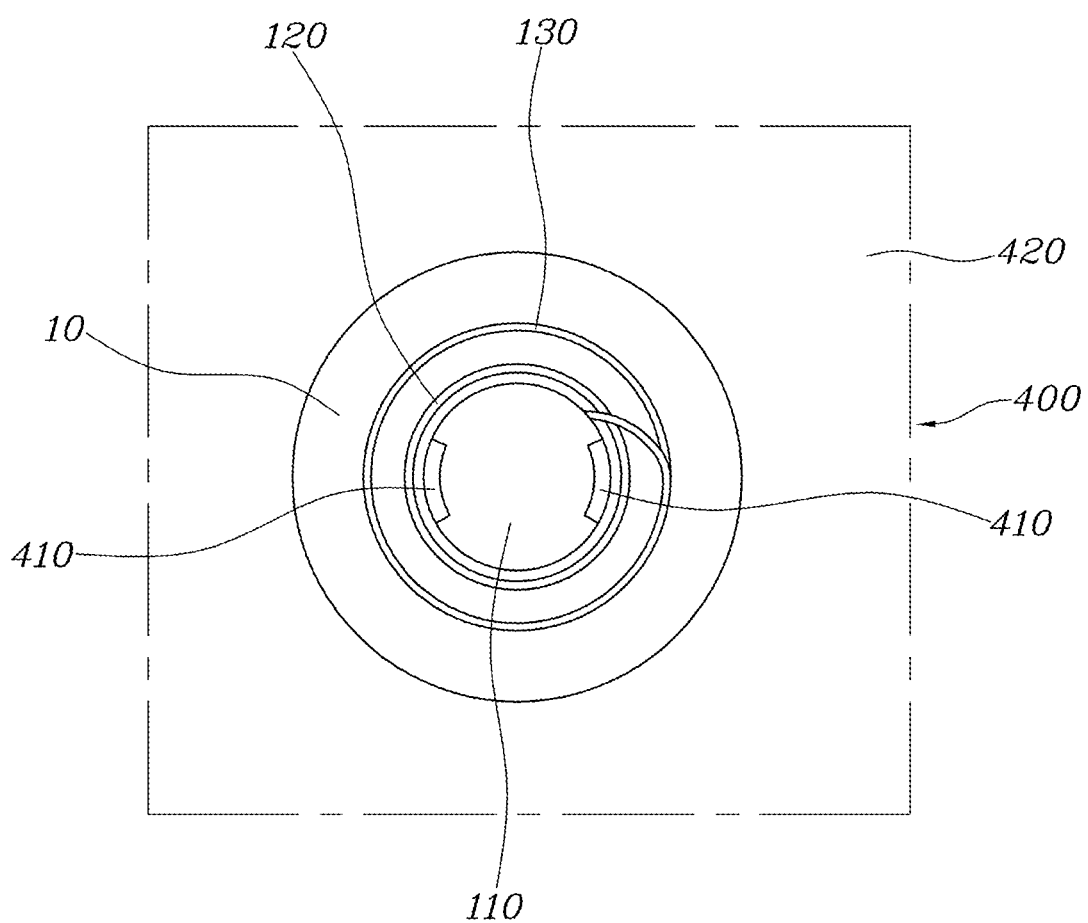
FIGS. 7 and 8 are views for describing another embodiment in which a first permanent magnet according to the present disclosure is provided on a steering shaft.
Figure 8:
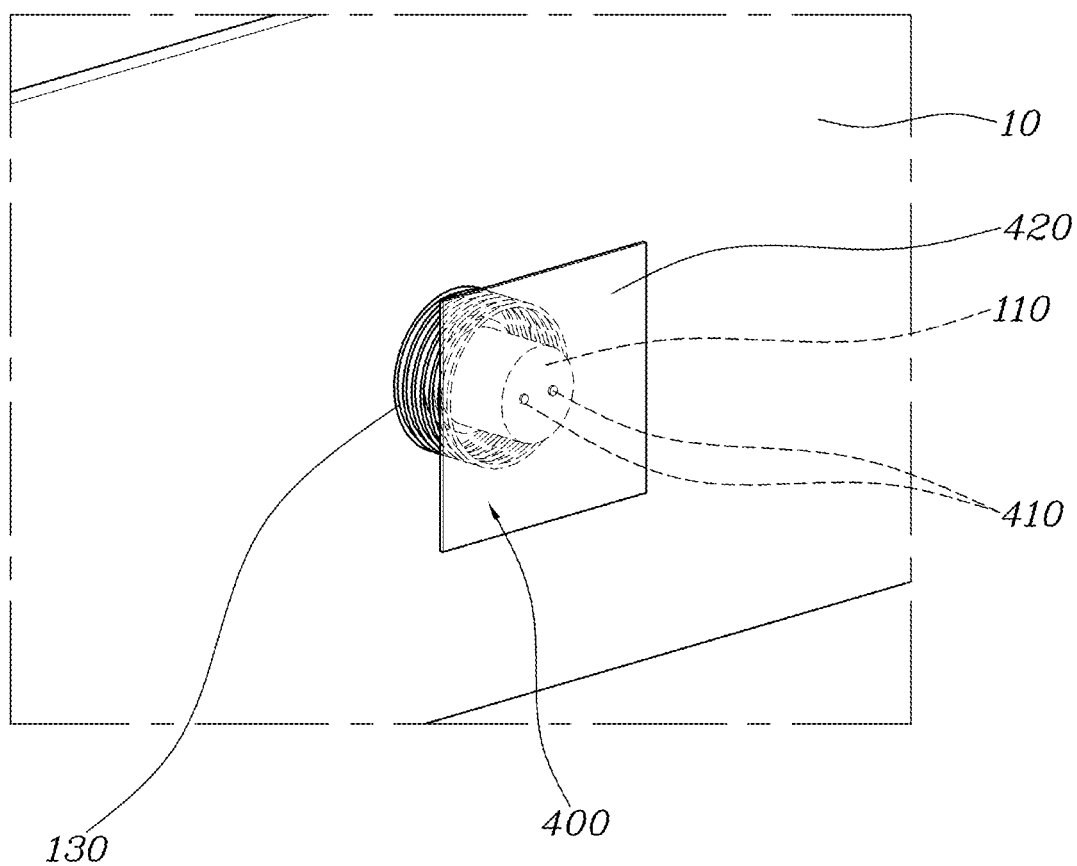

As another example, as illustrated in FIGS. 7 and 8, the two first permanent magnets 410 may be fixedly provided on the steering shaft 110.

FIG. 7 is a view illustrating a configuration in which the two first permanent magnets 410 are symmetrically coupled to a circumferential portion of the steering unit 110, and FIG. 8 is a view illustrating a configuration in which the two first permanent magnets 410 are symmetrically coupled to an end portion surface of the steering shaft 110 passing through the center fascia 10.

As illustrated in FIG. 8, when the first permanent magnet 410 is coupled to an end portion surface of the steering shaft 110, the first PCB 420 is provided to face the first permanent magnet 410 in a state of being spaced apart from the center fascia 10, and in this case, the first PCB 420 is installed to be connected to the center fascia 10 or a nearby body via a separate bracket, recognizes the change in magnetic flux through the Hall sensor when the first permanent magnet 410 is rotated by the rotation of the steering shaft 110, and generates the signal related to the steering.

The acceleration unit 500 according to the present disclosure includes a first slider 520 installed to be moved in a longitudinal direction of the right display 200 and having an end portion provided with a first handle 510, a third power unit 530 connecting the right display 200 to the first slider 520 and for moving the first slider 520 with respect to the right display 200 when operated, an acceleration button 540 rotatably provided on the first handle 510 and operated by the driver's pressing, a second permanent magnet 550 coupled to the acceleration button 540, and a second PCB 560 installed on the second slider 520 to face the second permanent magnet 550 and for recognizing the change in magnetic flux when the second permanent magnet 550 is moved by the operation of the acceleration button 540 and generating the signal related to the acceleration.

The right display 200 may be formed in a hollow type with an empty inside, and the first slider 520 may be installed to be inserted into an internal space of the right display 200 and slide from side to side in the longitudinal direction of the right display 200.

The first handle 510 that a driver may grip with his/her hand is provided on an end portion of the first slider 520 protruding from the right display 200, and the driver may perform a steering operation by gripping the first handle 510 and rotating the center display 100, and thus the first handle 510 functions as a steering handle for enabling the driver's steering operation.

The acceleration button 540 has one end rotatably coupled to an upper end of the first handle 510 via a hinge 541, and the driver presses the other end and operates the acceleration button 540.

The more the driver presses the acceleration button 540, the faster the vehicle may accelerate.

The acceleration button 540 is installed to be supported by an acceleration return spring 570.

The acceleration return spring 570 is installed to have one end supported by an inner side of the acceleration button 540 and the other end supported by an inner surface of the first handle 510 and functions to provide a return force when the acceleration button 540 is operated.

It is preferable that a plurality of acceleration return springs 570 are formed for safety and may be formed of a coil spring.

It is preferable that two second permanent magnets 550 are formed for safety, but the present disclosure is not limited thereto.

Figure 14:
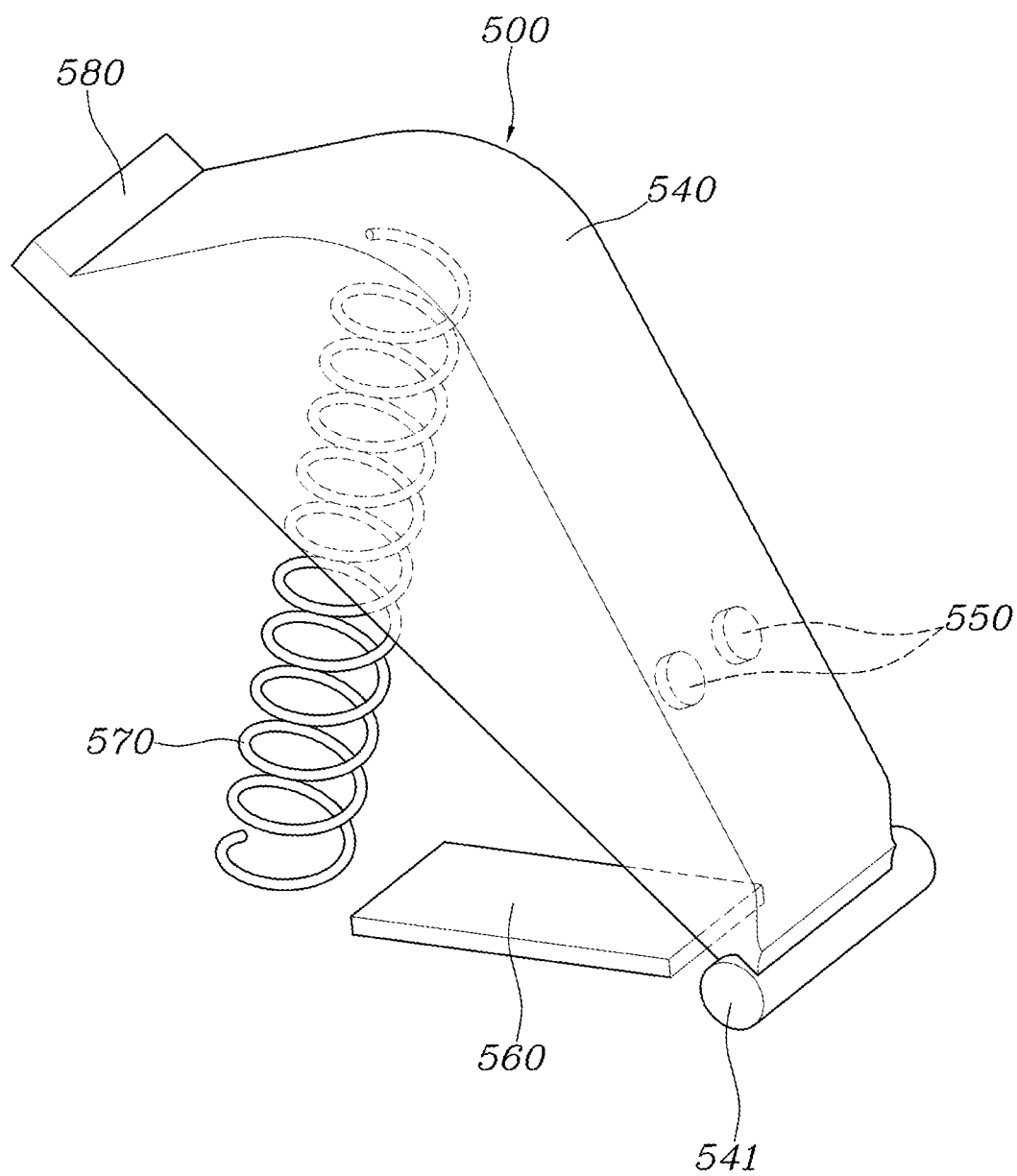
Figure 15:
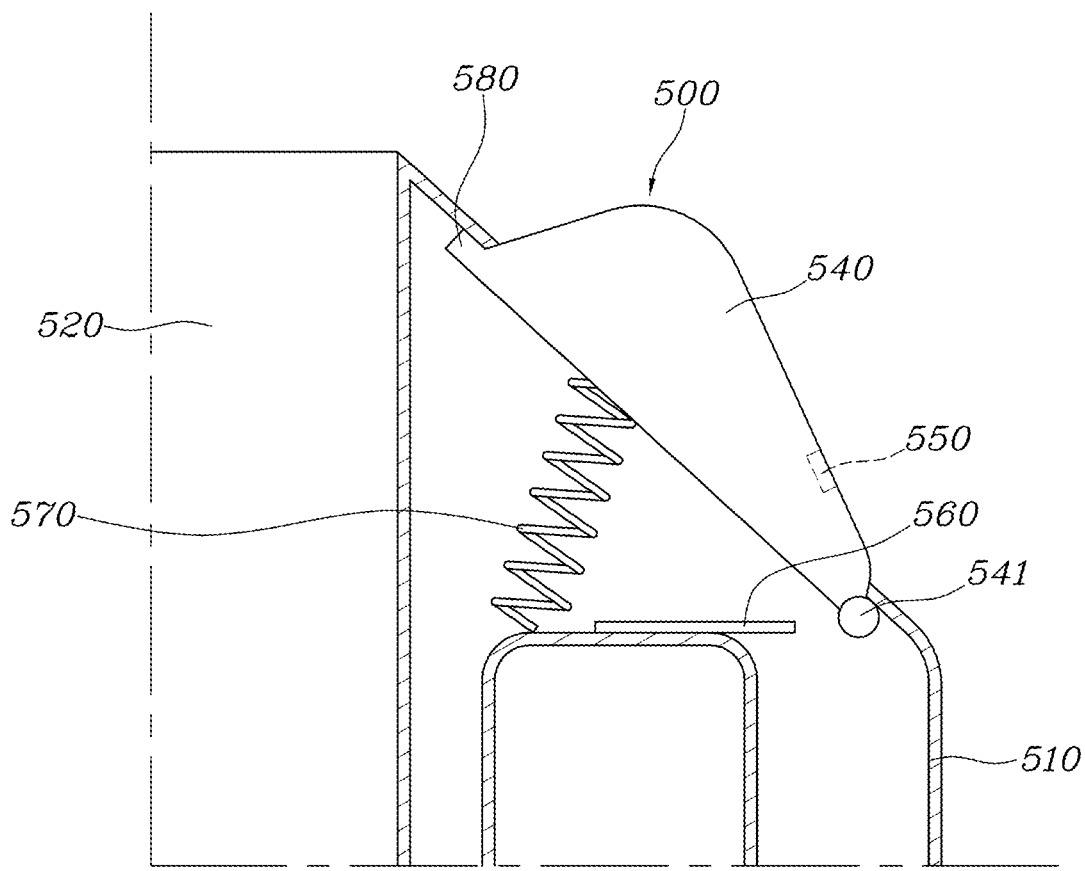
Figure 16:
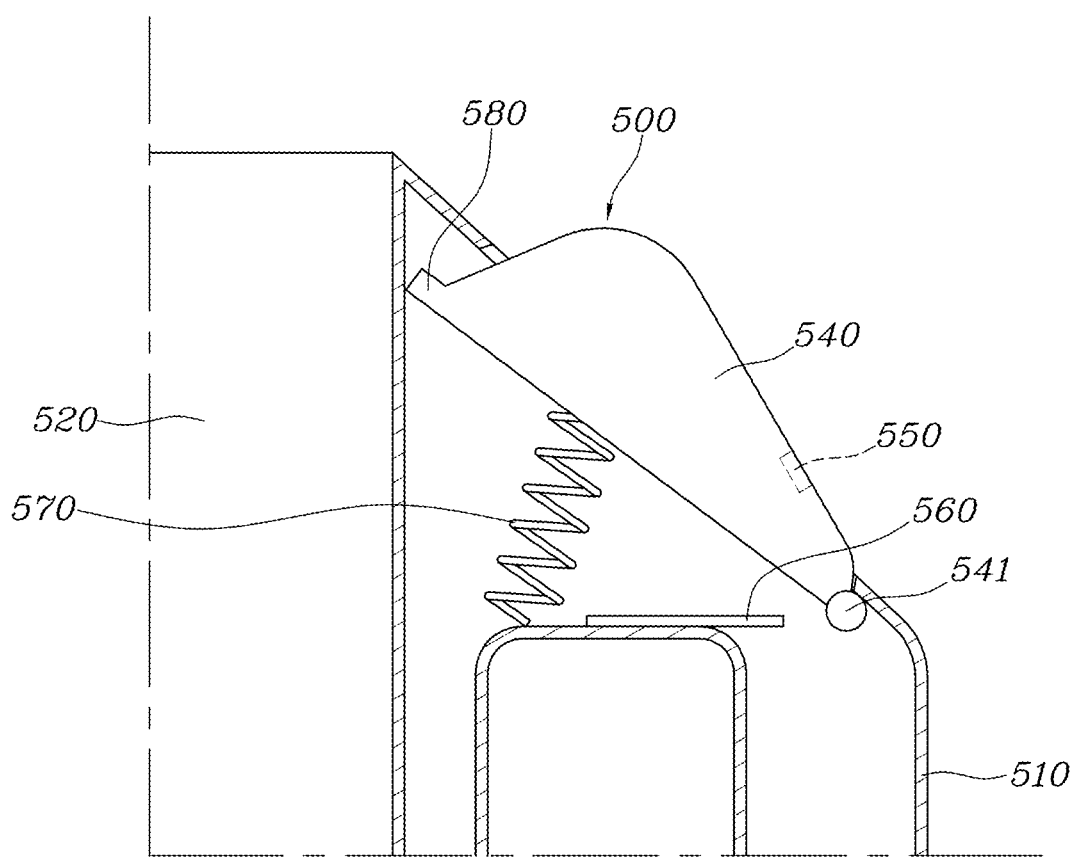

As illustrated in FIGS. 14 to 16, the two second permanent magnets 550 may be fixed to an inner upper surface of the acceleration button 540, and in this case, the second PCB 560 is fixed to an inner upper surface of the first handle 510 facing the second permanent magnet 550, recognizes a change in magnetic flux through the Hall sensor when the second permanent magnet 550 is moved by the rotation of the acceleration button 540, and generates the signal related to the acceleration.

Figure 17:
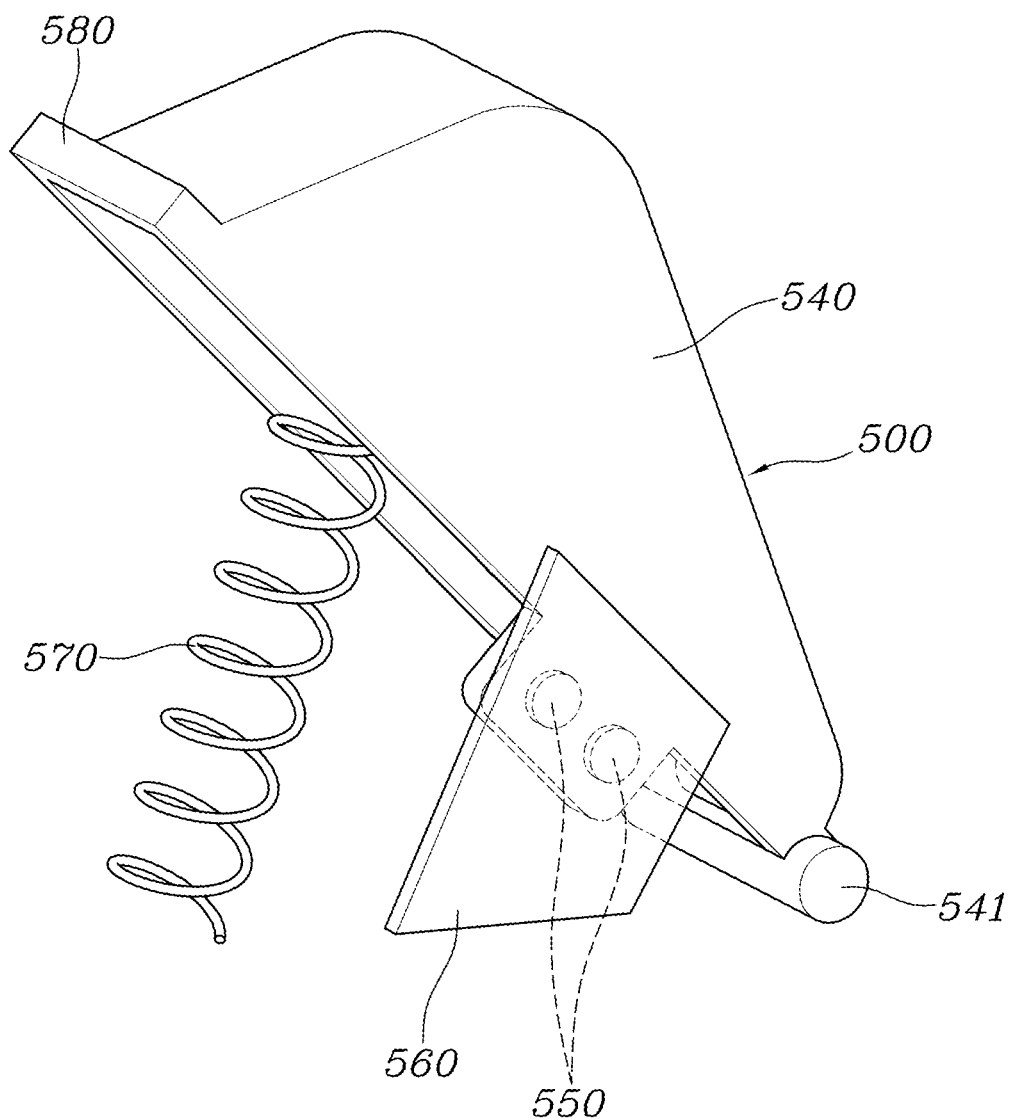
Figure 18:
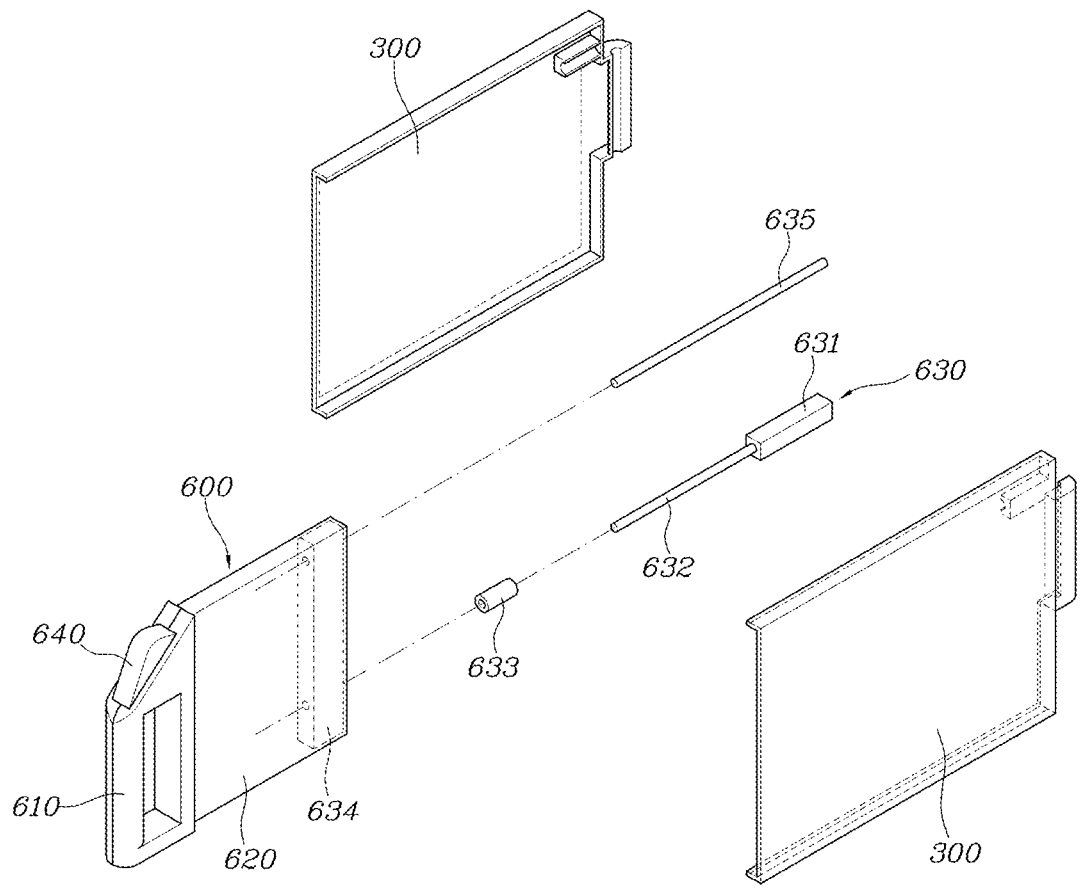
FIGS. 18, 19, 20, 21, 22, and 23 are views for describing the braking unit according to the present disclosure.
Figure 19:
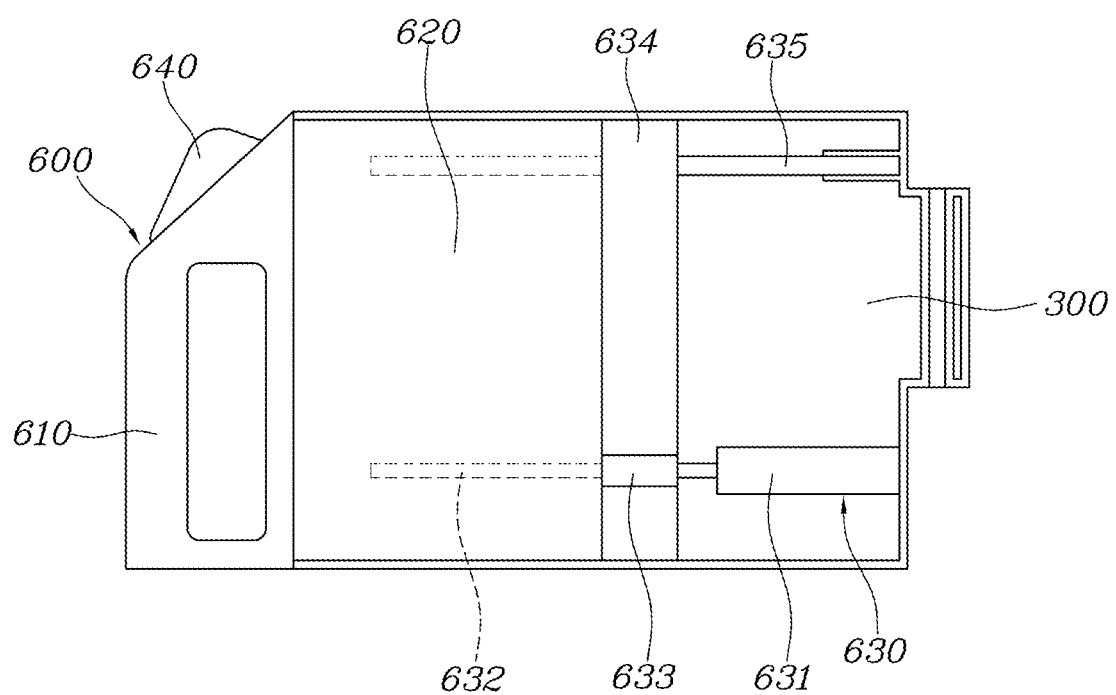

As another example, as illustrated in FIG. 17, the two second permanent magnets 550 may be fixed to a side surface of the acceleration button 540, and in this case, the second PCB 560 may be fixed to an inner side surface of the first handle 510 to face the second permanent magnet 550.

The third power unit 530 includes a third motor 531 fixed to the right display 200, a first ball screw 532 rotated by power of the third motor 531, a first ball screw nut 533 coupled to the first ball screw 532 and for moving along the first ball screw 532 when the first ball screw 532 is rotated, and a first guider 534 coupled to the first ball screw nut 533 and the first slider 520 and for moving the first slider 520 while moving with the first ball screw nut 533.

The third motor 531 may be installed to be positioned on a left lower end inside the right display 200, and the first ball screw 532 has one end connected to the third motor 531 and the other end passing through the first guider 534 and then positioned as an internal space of the first slider 520, and to this end, it is preferable that the first slider 520 is formed in a hollow type with an empty inside, but the present disclosure is not limited thereto.

When the driving mode of the vehicle is changed from the autonomous driving mode to the manual driving mode or changed from the manual driving mode to the autonomous driving mode, the first motor 710 and the second motor 810 are operated together, the center display 100, the right display 200, and the left display 300 may be popped up or hidden, the third motor 531 may also be operated together, and the first slider 520 slides along the right display 200.

Figure 13:
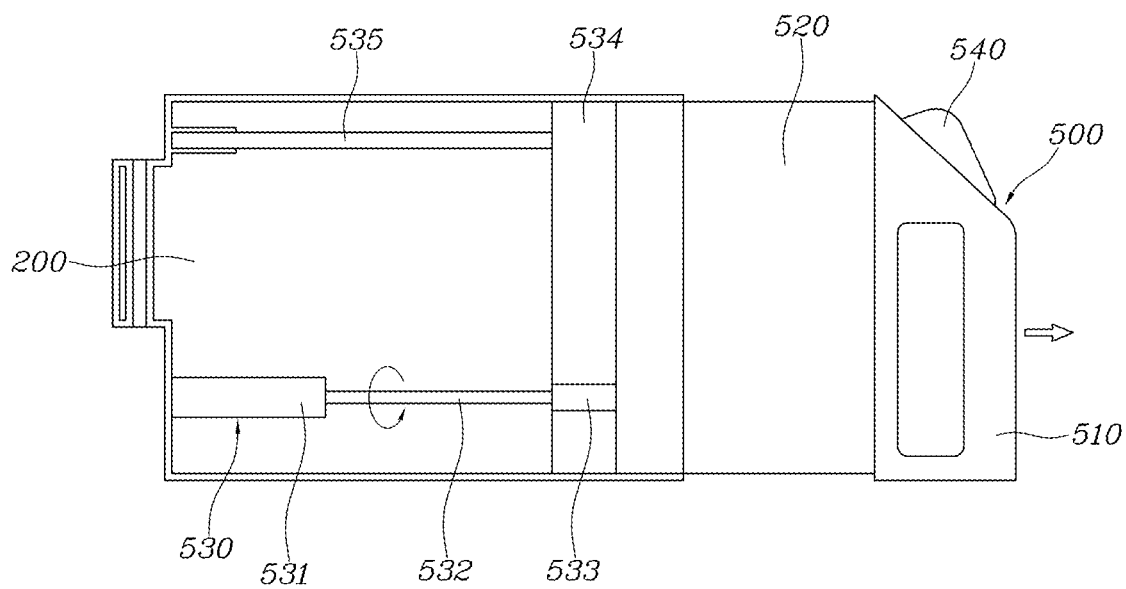

When the right display 200 is popped up, as illustrated in FIG. 13, the first slider 520 is moved in a direction protruding from the right display 200 by rotational power of the third motor 531, and when the right display 200 is hidden, the first slider 520 is moved in a direction of being inserted into the right display 200.

In addition, when comparing a case in which the right display 200 is popped up at the right angle with respect to the center display 100 and a case in which the right display 200 is popped up at the obtuse angle with respect to the center display 100, an amount of protrusion of the first slider 520 in the case in which the right display 200 is popped up at the right angle may be relatively smaller.

Since the first handle 510 is positioned closer to the driver in the case in which the right display 200 is popped up at the right angle than in the case in which the right display 200 is popped up at the obtuse angle, it is preferable that the amount of protrusion of the first slider 520 becomes smaller in the situation in which the right display 200 is popped up at the right angle than in the situation in which the right display 200 is popped up at the obtuse angle so as to allow the driver to grip the first handle 510 more stably.

The third motor 531 may be configured to be operated together under the control of the vehicle control unit when the first and second motors 710 and 810 are operated or configured to be individually operated regardless of the first and second motors 710 and 810 by operating a separate switch by the driver.

The third power unit 530 further includes a first guide rod 535 disposed parallel to the first ball screw 532 and installed to have one end fixed to the right display 200 and the other end passing through the first guider 534.

The first guide rod 535 is a rod having a straight circular cross-section and disposed above the first ball screw 532.

The first guide rod 535 may function to guide the movement of the first guider 534 to straightly move stably, and in particular, additionally support the first guider 534 to increase the stiffness of the first handle 510, and thus even when the driver operates the first handle 510 with a strong force, may function to prevent the deformation of the first handle 510.

According to the present disclosure, an acceleration button protrusion 580 may be provided to protrude outward from the acceleration button 540, and the acceleration button protrusion 580 may be integrally formed with the acceleration button 540.

As illustrated in FIG. 16, when the acceleration button protrusion 580 is in contact with an inner wall surface of the first handle 580 by the driver's operation of the acceleration button 540, a pull stroke position of the acceleration button 540 may be restricted, and as illustrated in FIG. 15, when the acceleration button protrusion 580 is in contact with the inner upper surface of the first handle 510, a return position or initial position of the acceleration button 540 may be restricted.

The acceleration button 540 has one end rotatably coupled to the upper surface of the first handle 510 via the hinge 541 and the other end formed with the acceleration button protrusion 580 protruding outward.

Therefore, when the driver presses and operates the acceleration button 540, as illustrated in FIG. 16, the acceleration button 540 may be inserted into the first handle 510 while rotating about the hinge 541, and at this time, when the acceleration button protrusion 580 is in contact with the inner wall surface of the first handle 510, the full stroke position when the acceleration button 540 is operated may be restricted.

In addition, when the driver removes a pressing force from the acceleration button 540 in the state of FIG. 16, as illustrated in FIG. 15, the acceleration button 540 may be rotated about the hinge 541 by a spring force of the acceleration return spring 570 to protrude outward from the first handle 510, and at this time, when the acceleration button protrusion 580 is in contact with the inner upper surface of the first handle 510, the return position or initial position of the acceleration button 540 may be restricted.

The braking unit 600 according to the present disclosure includes a second slider 620 installed to be moved in a longitudinal direction of the left display 300 and having an end portion provided with a second handle 610, a fourth power unit 630 connecting the left display 300 to the second slider 620 and for moving the second slider 620 with respect to the left display 300 when operated, a braking button 640 rotatably provided on the second handle 610 and operated by the driver's pressing, a third permanent magnet 650 coupled to the braking button 640, and a third PCB 660 installed on the second slider 620 to face the third permanent magnet 650 and for recognizing a change in magnetic flux when the third permanent magnet 650 is moved by the operation of the braking button 640 and generating the signal related to the braking.

The left display 300 may be formed in a hollow type with an empty inside, and the second slider 620 may be installed to be inserted into an internal space of the left display 300 and slide from side to side in the longitudinal direction of the left display 300.

The second handle 610 that a driver may grip with his/her hand is provided on an end portion of the second slider 620 protruding from the left display 300, and the driver may perform a steering operation by gripping the second handle 610 and rotating the center display 100, and thus the second handle 610 functions as a steering handle for enabling the driver's steering operation.

The driver may perform the steering operation by rotating the center display 100 in the clockwise direction or counterclockwise direction in a state of gripping the first handle 510 provided on the first slider 520 and the second handle 610 provided on the second slider 620 with both hands.

The more the driver performs the steering rotation during steering operation, the larger a steering angle of the vehicle becomes.

The braking button 640 has one end rotatably coupled to an upper end of the second handle 610 via a hinge 641, and the driver presses the other end and operates the braking button 640.

The more the driver presses the braking button 640, the faster the vehicle may be braked.

When the driver operates the acceleration button 540 and the braking button 640 at the same time, in principle, only a braking signal is generated for safety so that the braking of the vehicle is preferentially executed, and an acceleration signal is ignored and not generated.

The braking button 640 is installed to be supported by a braking return spring 670.

The braking return spring 670 is installed to have one end supported by an inner side of the braking button 640 and the other end supported by an inner surface of the second handle 610 and functions to provide a return force when the braking button 640 is operated.

It is preferable that a plurality of braking return springs 670 are formed for safety and may be formed of a coil spring.

It is preferable that two third permanent magnets 650 are formed for safety, but the present disclosure is not limited thereto.

Figure 21:
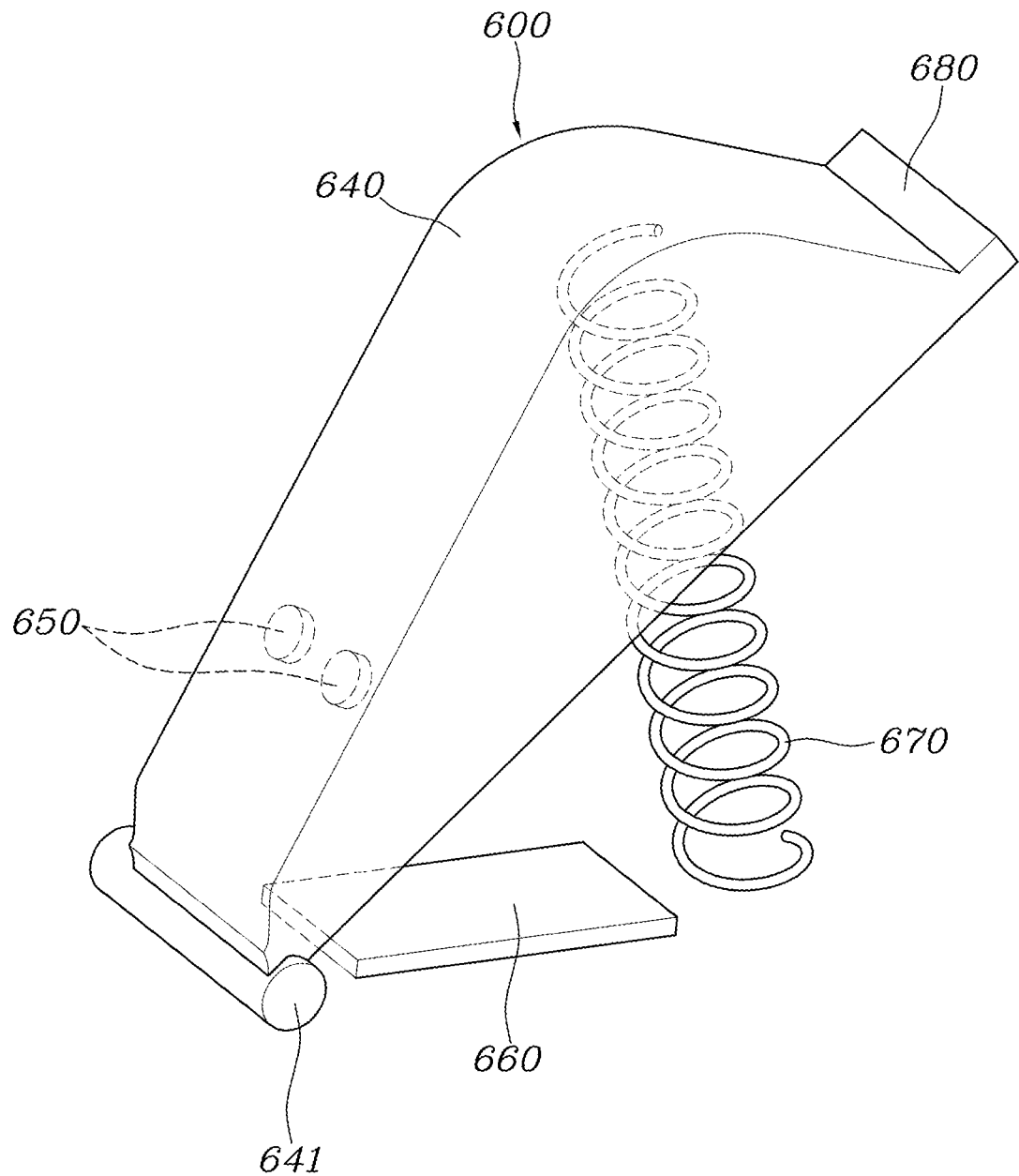
Figure 22:
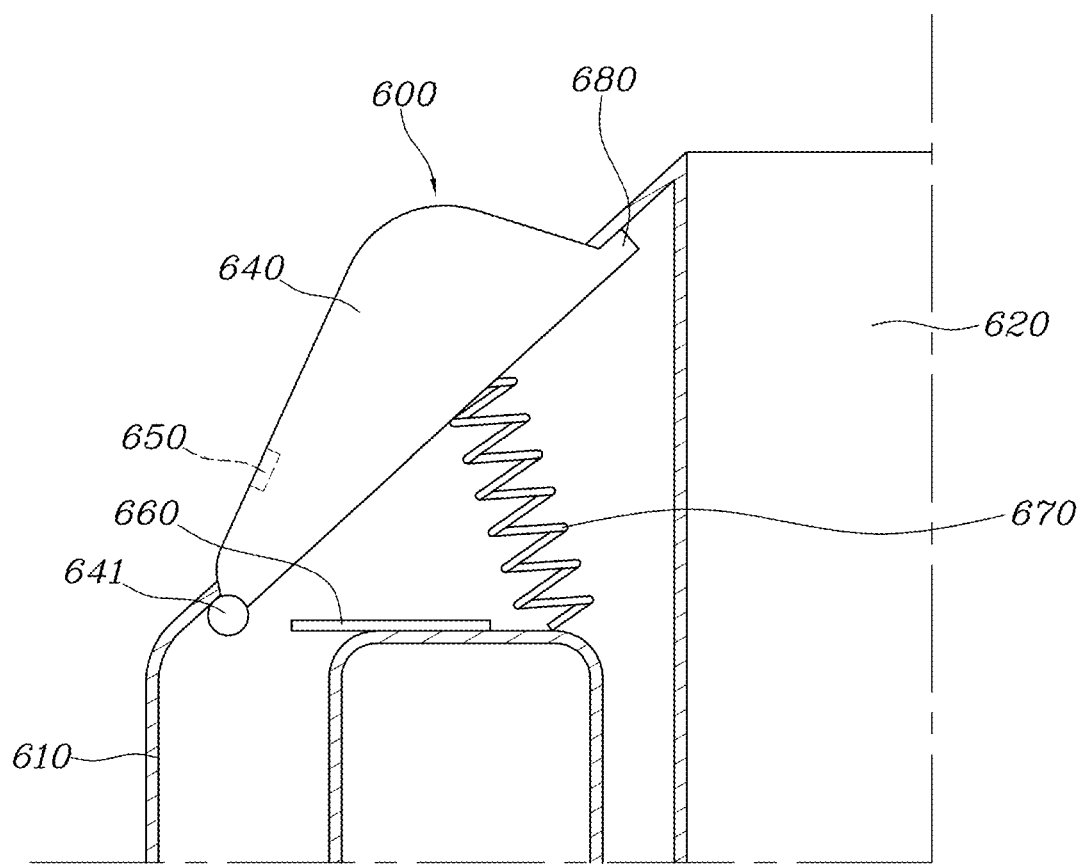
Figure 23:
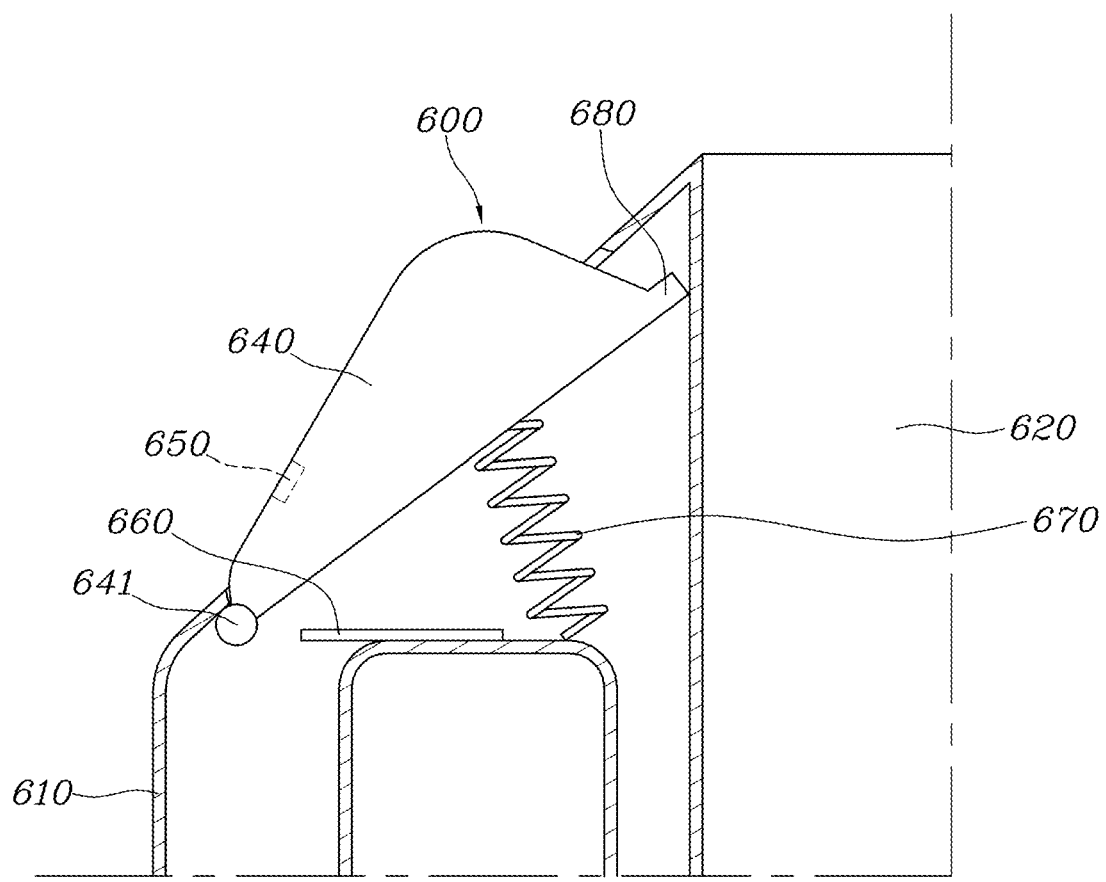

As illustrated in FIGS. 21 to 23, the two third permanent magnets 650 may be fixed to an inner upper surface of the braking button 640, and in this case, the third PCB 660 is fixed to an inner upper surface of the second handle 610 facing the third permanent magnet 650, recognizes the change in magnetic flux through the Hall sensor when the third permanent magnet 650 is moved by the rotation of the braking button 640, and generates the signal related to the braking.

As another example, the two third permanent magnets 650 may be fixed to a side surface of the braking button 640 in the form as illustrated in FIG. 17, and in this case, the third PCB 660 may be fixed to an inner side surface of the second handle 610 to face the third permanent magnet 650.

The fourth power unit 630 includes a fourth motor 631 fixed to the left display 300, a second ball screw 632 rotated by power of the fourth motor 631, a second ball screw nut 633 coupled to the second ball screw 632 and for moving along the second ball screw 632 when the second ball screw 632 is rotated, and a second guider 634 coupled to the second ball screw nut 633 and the second slider 620 and for moving the second slider 620 while moving with the second ball screw nut 633.

The fourth motor 631 may be installed to be positioned on a right lower end inside the left display 300, and the second ball screw 632 has one end connected to the fourth motor 631 and the other end passing through the second guider 634 and then positioned as an internal space of the second slider 620, and to this end, it is preferable that the second slider 620 is formed in a hollow type with an empty inside, but the present disclosure is not limited thereto.

When the driving mode of the vehicle is changed from the autonomous driving mode to the manual driving mode or changed from the manual driving mode to the autonomous driving mode, the first motor 710 and the second motor 810 are operated together, the center display 100, the right display 200, and the left display 300 may be popped up or hidden, the fourth motor 631 may also be operated together, and the second slider 620 slides along the left display 300.

Figure 20:
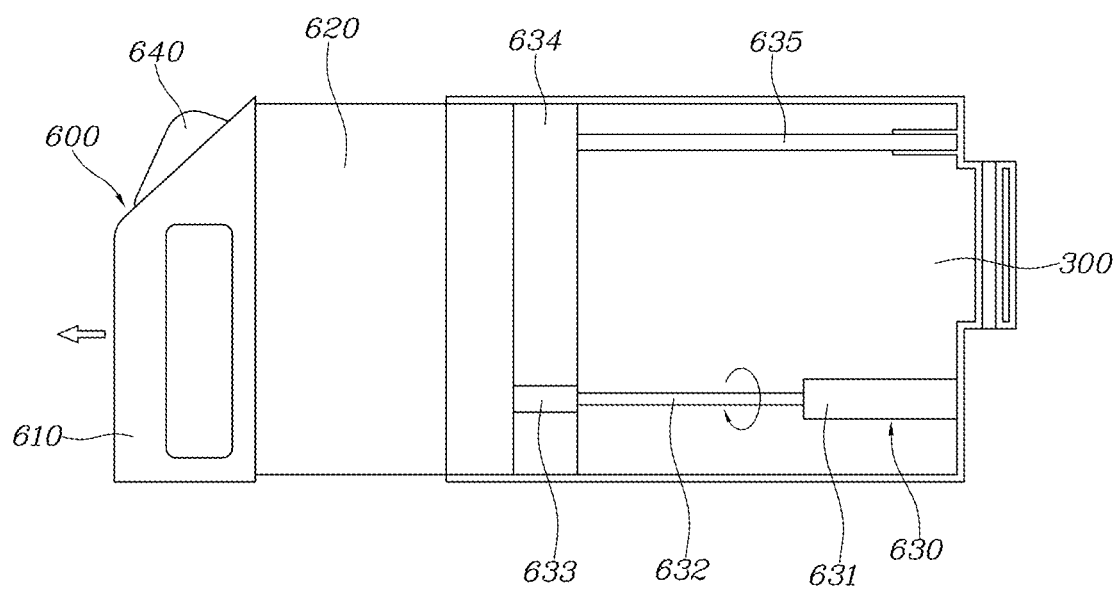

When the left display 300 is popped up, as illustrated in FIG. 20, the second slider 620 is moved in a direction protruding from the left display 300 by rotational power of the fourth motor 631, and when the left display 300 is hidden, the second slider 620 is moved in a direction of being inserted into the left display 300.

In addition, when comparing a case in which the left display 300 is popped up at the right angle with respect to the center display 100 and a case in which the left display 200 is popped up at the obtuse angle with respect to the center display 100, an amount of protrusion of the second slider 620 in the case in which the left display 200 is popped up at the right angle may be relatively smaller.

Since the second handle 610 is positioned closer to the driver in the case in which the left display 300 is popped up at the right angle than in the case in which the left display 300 is popped up at the obtuse angle, it is preferable that the amount of protrusion of the second slider 620 becomes smaller in the situation in which the left display 300 is popped up at the right angle than in the situation in which the left display 300 is popped up at the obtuse angle so as to allow the driver to grip the second handle 610 more stably.

The fourth motor 631 may be configured to be operated together under the control of the vehicle control unit when the first and second motors 710 and 810 are operated or configured to be individually operated regardless of the first and second motors 710 and 810 by operating a separate switch by the driver.

It is preferable that the third motor 531 and the fourth motor 631 are operated together and the operating times are the same, but the present disclosure is not limited thereto.

The fourth power unit 630 further includes a second guide rod 635 disposed parallel to the second ball screw 632 and installed to have one end fixed to the left display 300 and the other end passing through the second guider 634.

The second guide rod 635 is a rod having a straight circular cross-section and disposed above the second ball screw 632.

The second guide rod 635 may function to guide the movement of the second guider 634 to straightly move stably, and in particular, additionally support the second guider 634 to increase the stiffness of the second handle 610, and thus even when the driver operates the second handle 610 with a strong force, may function to prevent the deformation of the second handle 610.

According to the present disclosure, a braking button protrusion 680 may be provided to protrude outward from the braking button 640, and the braking button protrusion 680 may be integrally formed with the braking button 640.

As illustrated in FIG. 23, when the braking button protrusion 680 is in contact with an inner wall surface of the second handle 610 by the driver's operation of the braking button 640, a pull stroke position of the braking button 640 may be restricted, and as illustrated in FIG. 22, when the braking button protrusion 680 is in contact with the inner upper surface of the second handle 610, a return position or initial position of the braking button 640 may be restricted.

The braking button 640 has one end rotatably coupled to the upper surface of the second handle 610 via the hinge 641 and the other end formed with the braking button protrusion 680 protruding outward.

Therefore, when the driver presses and operates the braking button 640, as illustrated in FIG. 23, the braking button 640 may be inserted into the second handle 610 while rotating about the hinge 641, and at this time, when the braking button protrusion 680 is in contact with the inner wall surface of the second handle 610, the full stroke position when the braking button 640 is operated may be restricted.

In addition, when the driver removes a pressing force from the braking button 640 in the state of FIG. 23, as illustrated in FIG. 22, the braking button 640 may be rotated about the hinge 641 by a spring force of the braking return spring 670 to protrude outward from the second handle 610, and at this time, when the braking button protrusion 680 is in contact with the inner upper surface of the second handle 610, the return position or initial position of the braking button 640 may be restricted.

In addition, the driving operation apparatus according to the present disclosure includes the center display 100 installed on the center fascia 10 inside a vehicle to be rotated in the clockwise direction or the counterclockwise direction, and the right display 200 and the left display 300 coupled to the right and the left sides of the center display 100, respectively to be rotated in the front-rear direction, in which in the autonomous driving mode, the screen in which the center display 100, the right display 200, and the left display 300 are unfolded in a row in the left-right direction and connected as one is provided, in the manual driving mode, the right display 200 and the left display 300 are popped up by being rotated toward the driver rearward from the center display 100, and the center display 100, the right display 200, and the left display 300, which have been popped up, become the driving operation system for a vehicle.

The driving operation system includes the steering, acceleration, and braking of the vehicle, the acceleration button 540 is provided on the right display 200, the braking button 640 is provided on the left display 300, the steering of the vehicle is executed when the center display 100 is rotated in the clockwise direction or the counterclockwise direction by the driver's operation, and the acceleration or braking of the vehicle is executed during the driver's operation of the acceleration button 540 or the braking button 640.

As described above, the driving operation apparatus for a vehicle according to the present disclosure may have the configuration that has the driving operation system for steering, acceleration, and braking of the vehicle through the steering unit 400 provided on the center display 100, the acceleration unit 500 provided on the right display 200, and the braking unit 600 provided on the left display 300 integrally modularized as one system, thereby achieving the reduction in the weight and the reduction in the cost by decreasing the number of components and in particular, maximizing the utilization of the indoor space by minimizing the layout required for the installation space.

In addition, the driving operation apparatus according to the present disclosure may have the configuration that becomes a hide state in which the driver's operation is not available as the center display 100, the right display 200, and the left display 300 are unfolded in a row from side to side and are in close contact with the center fascia 10 in the autonomous driving situation and is popped up so that the right display 200 and the left display 300 protrude toward the driver to be operated by the driver in the manual driving mode, thereby allowing the driver to rest comfortably in the autonomous driving situation and achieving safety improvement by blocking the mal-operation.

In addition, the driving operation apparatus according to the present disclosure may have the display to assist to improve the passenger's entertainment in the autonomous driving situation and provide the vehicle information and the nearby information in the manual driving mode, thereby improving convenience and safety.

Although the specific embodiments of the present disclosure have been illustrated and described, it will be apparent to those skilled in the art that the present disclosure may be variously improved and changed without departing from the technical spirit of the present disclosure provided by the appended claims.

The invention claimed is:

1. A driving operation apparatus for a vehicle, comprising:
a center display rotatably positioned on a center fascia inside the vehicle;
a right display rotatably coupled to a right side of the center display, and a left display rotatably coupled to a left side of the center display;
a steering unit positioned on the center display and the center fascia, the steering unit being configured to generate a signal related to a steering of the vehicle when the center display is rotated in a clockwise direction or counterclockwise direction by a driver's operation;
an acceleration unit positioned on one of the right display and the left display, the acceleration unit being configured to generate a signal related to an acceleration of the vehicle during the driver's operation; and
a braking unit positioned on an other one of the right display and the left display than the acceleration unit, the braking unit being configured to generate a signal related to a braking of the vehicle during the driver's operation.

2. The driving operation apparatus according to claim 1, further comprising a screen in which the center display, the right display, and the left display are unfolded in a row in a left-right direction and are connected as one during an autonomous driving mode.

3. The driving operation apparatus according to claim 2, wherein in the autonomous driving mode, positions of the right display and the left display unfolded in a row are restricted by contact with the center fascia.

4. The driving operation apparatus according to claim 1, wherein in a manual driving mode, the right display and the left display are popped up by being rotated toward the driver rearward from the center display, and in the popped-up state, screens in which the center display, the right display, and the left display are individually separated are provided.

5. The driving operation apparatus according to claim 4, wherein the right display and the left display popped up in the manual driving mode form a right angle or an obtuse angle with respect to the center display, and when the right display and the left display form the obtuse angle, popped-up angles of the right display and the left display are the same.

6. The driving operation apparatus according to claim 5, wherein positions of the right display and the left display popped up at the right angle are restricted during contact with the right and left sides of the center display, or positions of the right display and the left display popped up at the obtuse angle are restricted by locking of an actuator configured to pop up the right display and the left display.

7. The driving operation apparatus according to claim 1, further comprising a first power unit connecting the center display to the right display, the first power unit being configured to rotate the right display with respect to the center display when operated, and
wherein the first power unit includes:
a first motor fixed to a right side portion of the center display; and
a first motor rod which is rotated by the first motor, which is integrally coupled after passing through a left side portion of the right display, and wherein an end portion of the first motor rod is rotatably connected to the right side portion of the center display.

8. The driving operation apparatus according to claim 1, further comprising a second power unit connecting the center display to the left display, the second power unit being configured to rotate the left display with respect to the center display when operated, and
wherein the second power unit includes:
a second motor fixed to a left side portion of the center display; and
a second motor rod which is rotated by the second motor, which is integrally coupled after passing through a right side portion of the left display, and wherein an end portion of the second motor rod is rotatably installed on the left side portion of the center display.

9. The driving operation apparatus according to claim 1, wherein the center display includes:
a steering shaft protruding forward to pass through the center fascia, and configured to rotate with respect to the center fascia;
a steering shaft clip coupled to the steering shaft and configured to prevent the steering shaft from being separated from the center fascia; and
a steering return spring having two ends, wherein both ends are coupled to the center fascia and the steering shaft, and wherein the steering return spring is configured to provide a return force when the steering shaft is rotated.

10. The driving operation apparatus according to claim 9, wherein the steering unit includes:
a first permanent magnet coupled to a front surface of the center display or the steering shaft; and
a first printed circuit board (PCB) positioned to face the first permanent magnet and being configured to recognize a change in magnetic flux when the first permanent magnet is rotated and generate a signal related to a steering.

11. The driving operation apparatus according to claim 1, wherein the acceleration unit includes:
a first slider configured to be moved in a longitudinal direction of the right display and having an end portion provided with a first handle;
a third power unit connecting the right display to the first slider, the third power unit being configured to move the first slider with respect to the right display when operated;
an acceleration button rotatably provided on the first handle and operated by a driver's pressing;
a second permanent magnet coupled to the acceleration button; and
a second PCB installed on the first slider to face the second permanent magnet, the second PCB being configured to recognize a change in magnetic flux when the second permanent magnet is moved by the acceleration button, and to generate a signal related to an acceleration.

12. The driving operation apparatus according to claim 11, wherein the third power unit includes:
a third motor fixed to the right display;
a first ball screw configured to be rotated by the third motor;
a first ball screw nut coupled to the first ball screw and configured to move along the first ball screw when the first ball screw is rotated; and
a first guider coupled to the first ball screw nut and the first slider and configured to move the first slider while moving with the first ball screw nut.

13. The driving operation apparatus according to claim 12, wherein the third power unit further includes a first guide rod positioned parallel to the first ball screw, and configured to have one end fixed to the right display and an other end passing through the first guider.

14. The driving operation apparatus according to claim 11, wherein an acceleration button protrusion protrudes outwardly from the acceleration button, and
a full stroke position of the acceleration button is restricted when the acceleration button protrusion is in contact with an inner wall surface of the first handle, and when the acceleration button protrusion is in contact with an inner upper surface of the first handle, a return position or initial position of the acceleration button is restricted.

15. The driving operation apparatus according to claim 1, wherein the braking unit includes:
a second slider configured to be moved in a longitudinal direction of the left display and having an end portion provided with a second handle;
a fourth power unit connecting the left display to the second slider and configured to move the second slider with respect to the left display when operated;
a braking button rotatably provided on the second handle and operated by a driver's pressing;
a third permanent magnet coupled to the braking button; and
a third PCB installed on the second slider to face the third permanent magnet, the third PCB being configured to recognize a change in magnetic flux when the third permanent magnet is moved by an operation of the braking button, and to generate a signal related to a braking.

16. The driving operation apparatus according to claim 15, wherein the fourth power unit includes:
a fourth motor fixed to the left display;
a second ball screw configured to be rotated by the fourth motor;
a second ball screw nut coupled to the second ball screw and configured to move along the second ball screw when the second ball screw is rotated; and a second guider coupled to the second ball screw nut and the second slider and configured to move the second slider while moving with the second ball screw nut.

17. The driving operation apparatus according to claim 16, wherein the fourth power unit further includes a second guide rod positioned parallel to the second ball screw, and configured to have one end fixed to the left display and another end passing through the second guider.

18. The driving operation apparatus according to claim 15, wherein a braking button protrusion protrudes outwardly from the braking button, and
a full stroke position of the braking button is restricted when the braking button protrusion is in contact with an inner wall surface of the second handle, and when the braking button protrusion is in contact with an inner upper surface of the second handle, a return position or initial position of the braking button is restricted.

19. A driving operation apparatus for a vehicle, comprising:
a center display positioned on a center fascia inside the vehicle configured to be rotated in a clockwise direction or counterclockwise direction; and
a right display coupled to a right side of the center display and a left display coupled to a left side of the center display, the right and left displays being configured to be rotated in a front-rear direction;
a screen in which the center display, the right display, and the left display are unfolded in a row in a left-right direction and connected as one during an autonomous driving mode; and
in a manual driving mode, the right display and the left display are popped up by being rotated toward the driver rearward from the center display, and the center display, the right display, and the left display, which have been popped up, become a driving operation system of the vehicle.

20. The driving operation apparatus according to claim 19, wherein the driving operation system includes steering, acceleration, and braking of the vehicle,
an acceleration button is positioned on the right display, and a braking button is positioned on the left display,
the steering of the vehicle is executed when the center display is rotated in a clockwise direction or a counterclockwise direction by a driver, and
the acceleration or braking of the vehicle is executed when the driver operates the acceleration button or the braking button.

* * * * *